(12) United States Patent
Jeon et al.

(10) Patent No.: US 10,696,427 B2
(45) Date of Patent: Jun. 30, 2020

(54) METHOD OF CONTROLLING SATELLITE

(71) Applicant: KOREA AEROSPACE RESEARCH INSTITUTE, Yuseong-gu, Daejeon (KR)

(72) Inventors: Moon-Jin Jeon, Daejeon (KR); Seong-Bin Lim, Daejeon (KR); Seok-Weon Choi, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 575 days.

(21) Appl. No.: 15/623,911

(22) Filed: Jun. 15, 2017

(65) Prior Publication Data
US 2017/0361949 A1    Dec. 21, 2017

(30) Foreign Application Priority Data

Jun. 17, 2016 (KR) .................... 10-2016-0075712

(51) Int. Cl.
*B64G 1/36* (2006.01)
*B64G 1/10* (2006.01)
*B64G 1/24* (2006.01)

(52) U.S. Cl.
CPC .......... *B64G 1/36* (2013.01); *B64G 1/1021* (2013.01); *B64G 2001/1028* (2013.01); *B64G 2001/245* (2013.01)

(58) Field of Classification Search
CPC ................ B64G 1/36; B64G 1/1021; B64G 2001/1028; B64G 2001/245
See application file for complete search history.

(56) References Cited

U.S. PATENT DOCUMENTS

| 8,505,853 B2 * | 8/2013 | Lagadec ............ B64G 1/1021 244/171 |
| 2013/0169808 A1 * | 7/2013 | Delvit ................. H04N 17/002 348/144 |

FOREIGN PATENT DOCUMENTS

| JP | 2003-327200 A | 11/2003 |
| JP | 2013-141238 A | 7/2013 |
| KR | 2011-0028341 A | 3/2011 |
| KR | 10-1381293 B1 | 4/2014 |

OTHER PUBLICATIONS

Office Action dated Nov. 30, 2017, by the Korean Patent Office in corresponding Korean Patent Application No. 10-2016-0075712. (5 pages) with English translation by Global Dossier.

* cited by examiner

*Primary Examiner* — Justin M Benedik
(74) *Attorney, Agent, or Firm* — Buchanan Ingersoll & Rooney PC

(57) ABSTRACT

A method of controlling a satellite and a computer-readable recording medium are provided. The method is for controlling a satellite moving along an orbit having an inclination angle from the equatorial plane to capture due-north images. The method includes: determining a position of the satellite; calculating a roll angle and a pitch angle of the satellite for pointing a line-of-sight vector of the satellite to a first ground surface being a photographing point; determining a compensation angle by considering effects of the inclination angle and rotation of the Earth so as to capture images in the due north direction of the photographing point; calculating a yaw angle based on the compensation angle; and rotating the satellite according to the calculated roll angle, pitch angle, and yaw angle.

19 Claims, 12 Drawing Sheets

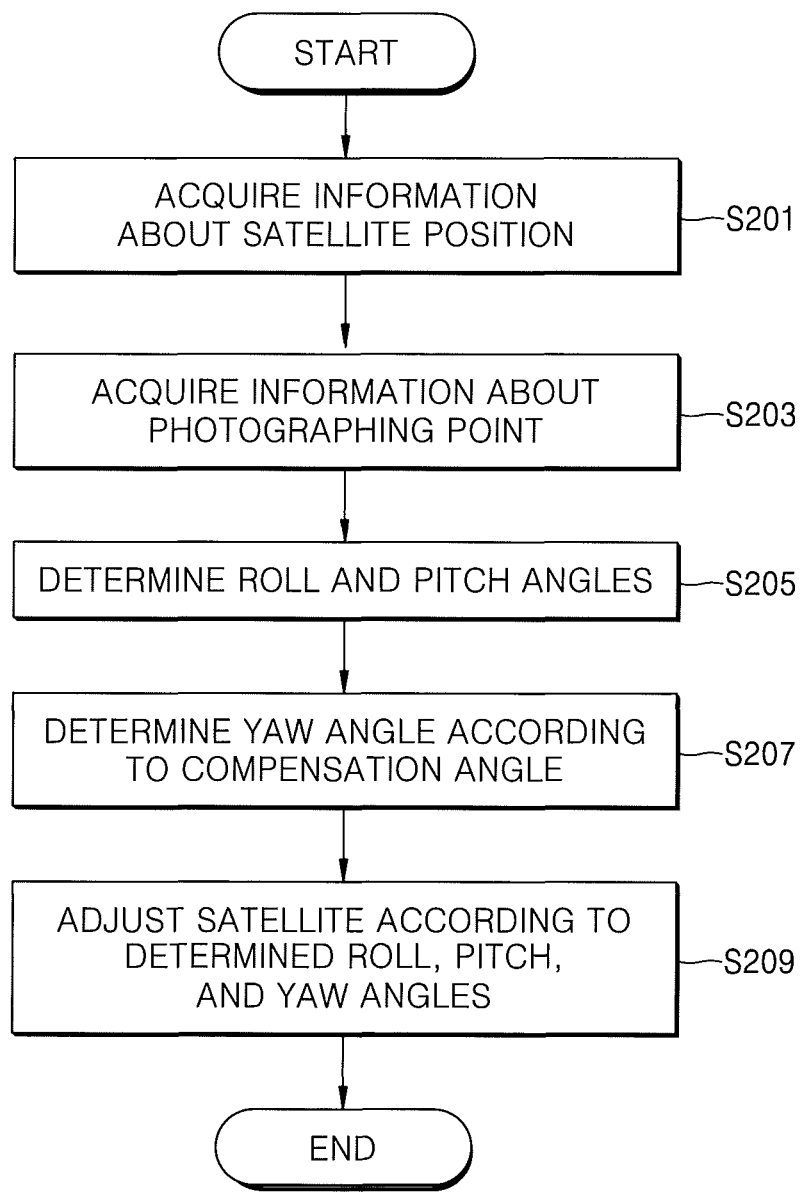

METHOD OF CONTROLLING SATELLITE

CROSS-REFERENCE TO RELATED APPLICATION

This application claims the benefit of Korean Patent Application No. 10-2016-0075712, filed on Jun. 17, 2016, in the Korean Intellectual Property Office, the disclosure of which is incorporated herein in its entirety by reference.

BACKGROUND

1. Field

One or more embodiments relate to a method of controlling a satellite to efficiently capture images in the due north direction for observing the Earth or a planet.

2. Description of the Related Art

Satellites operate their rocket engines until reaching orbit, and then move by inertia without operating the rocket engines. When a satellite orbits the Earth, the centripetal force, a pulling force acting on the satellite by the Earth, is equal to the centrifugal force, an outward-pushing force acting on the satellite. Therefore, after entering orbit, the satellite can continuously revolve around the Earth by inertia without additionally operating a rocket engine. Satellites may perform missions such as communication with earth stations, earth observation, weather observation, navigation and positioning, or space scientific research. Examples of satellites include equatorial orbiting satellites, polar orbiting satellites, and inclined orbit satellites, and satellites having different purposes have different orbits. Satellites may capture images of desired regions of the surface of the Earth and transmit the images to ground stations.

When a satellite captures images of a desired region of the surface of the Earth, there is an angular difference between the proceeding direction of the satellite and the direction of the ground trace of the satellite because of the rotation of the Earth, and thus it is difficult to capture images in the due north direction. In addition, it is more difficult for inclined orbit satellites to capture images in the due north direction because of inclined orbits.

SUMMARY

According to one or more embodiments, there is provided a method of controlling a satellite moving along an orbit having an inclination angle from the equatorial plane to capture due-north images, the method including: determining a position of the satellite; calculating a roll angle and a pitch angle of the satellite for pointing a line-of-sight vector of the satellite to a first ground surface being a photographing point; determining a compensation angle by considering effects of the inclination angle and rotation of the Earth so as to capture images in a direction corresponding to a due north direction of the photographing point; calculating a yaw angle based on the compensation angle; and rotating the satellite according to the calculated roll angle, pitch angle, and yaw angle.

The compensation angle may be determined by considering an angle between a ground trace pointing due north at the photographing point and a proceeding direction of the satellite.

The determining of the compensation angle may include: calculating a first position vector, the first position vector pointing from the center of the Earth to a first ground point (the photographing point) and expressed by a function of a first parameter varying according to revolution of the satellite; and calculating a first velocity unit vector by differentiating the first position vector with respect to the first parameter and normalizing the derivative of the first position vector, wherein the first velocity unit vector may be calculated without considering the influence of the rotation of the Earth.

The first parameter may be a variable related to an angle between a position vector pointing from the center of the Earth to the satellite and a straight line along which an orbital plane of the satellite meets the equatorial plane of the Earth.

The calculating of the first position vector may include: determining a nadir point based on the position of the satellite, the nadir point being a ground surface that the line-of-sight vector of the satellite meets when the line-of-sight vector points to the center of the Earth; and calculating a fourth position vector pointing from the center of the Earth to the nadir point and having a functional relationship with the first parameter.

The first position vector may be determined by considering the line-of-sight vector varying at the nadir point according to adjustment to the roll angle and the pitch angle.

The method may further include: calculating a second ground surface to which the line-of-sight vector points after the adjustment to the roll angle, and a second position vector pointing from the center of the Earth to the second ground surface; and calculating a third ground surface to which the line-of-sight vector points after the adjustment to the pitch angle, and a third position vector pointing from the center of the Earth to the third ground surface, wherein the first position vector may be one of the second position vector and the third position vector.

The calculating of the second position vector may include: calculating a first angle corresponding to the roll angle; and calculating the second position vector based on the first angle, wherein the first angle may be an angle between a position vector before the adjustment to the roll angle and a position vector after the adjustment to the roll angle.

The calculating of the third position vector may include: calculating a second angle corresponding to the pitch angle; and calculating the third position vector based on the second angle, wherein the second angle may be an angle at a reference point between a ground surface meeting the line-of-sight vector before the adjustment to the pitch angle and a ground surface meeting the line-of-sight vector after the adjustment to the pitch angle, and the reference point may be a center point between two points at which the line-of-sight vector crosses the surface of the Earth.

The calculating of the third position vector may include: calculating a position vector pointing to the reference point from the center of the Earth; and calculating the third position vector by rotating the ground surface meeting the line-of-sight vector before the adjustment to the pitch angle by the second angle around the position vector pointing to the reference point.

The determining of the compensation angle may further include: determining a first compensation angle for the rotation of the Earth by considering an angle between a second velocity vector and the first velocity unit vector, the second velocity vector being a velocity vector of the first ground point; and determining a second compensation angle for the inclination angle by considering an angle between the due north direction of the photographing point and the first velocity unit vector, wherein the compensation angle may be the sum of the first compensation angle and the second compensation angle.

The determining of the first compensation angle may include: calculating a first unit vector by normalizing the first position vector; calculating a second unit vector based on the first unit vector, the second unit vector pointing from the first ground point in a direction of the rotation of the Earth; and calculating the second velocity vector by adding a first velocity vector and a third velocity vector, the first velocity vector being calculated by multiplying the first velocity unit vector by a revolution speed of the satellite, the third velocity vector being calculated by multiplying the second unit vector by a rotation speed of the Earth at the first ground point.

The determining of the second compensation angle may include: calculating a direction vector being an cross product of the first unit vector and the third velocity vector, the direction vector contacting the photographing point and pointing due north, wherein the second compensation angle may be an angle between the direction vector and the first velocity unit vector.

The first position vector may be calculated in an XYZ orthogonal coordinate system having an XZ plane containing the orbital plane of the satellite and the origin at the center of the Earth.

The calculating of the first velocity unit vector may include rotating the first velocity unit vector and the first position vector around an X-axis based on the inclination angle.

The determining of the compensation angle may include: determining an angle between a second velocity vector and the first velocity unit vector as a first compensation angle for the rotation of the Earth, the second velocity vector being a velocity vector of the first ground point; and determining a second compensation angle for the inclination angle by considering an angle between the due north direction of the photographing point and the first velocity unit vector.

The determining of the first compensation angle may include: calculating a first unit vector by normalizing the first position vector; calculating a second unit vector based on the first unit vector, the second unit vector pointing from the first ground point in a direction of the rotation of the Earth; and calculating the second velocity vector by adding a first velocity vector and a third velocity vector, the first velocity vector being calculated by multiplying the first velocity unit vector by a revolution speed of the satellite, the third velocity vector being calculated by multiplying the second unit vector by a rotation speed of the Earth at the first ground point.

The determining of the second compensation angle may include calculating a direction vector being an cross product of the first unit vector and the third velocity vector, the direction vector contacting the photographing point and pointing due north, wherein the second compensation angle may be an angle between the direction vector and the first velocity unit vector.

According to one or more embodiments, a computer-readable recording medium stores a program for executing the method.

BRIEF DESCRIPTION OF THE DRAWINGS

These and/or other aspects will become apparent and more readily appreciated from the following description of the embodiments, taken in conjunction with the accompanying drawings in which:

FIG. 13 is a flowchart illustrating a method of adjusting the roll angle, the pitch angle, and the yaw angle of the satellite according to an embodiment.

DETAILED DESCRIPTION

Figure 1:
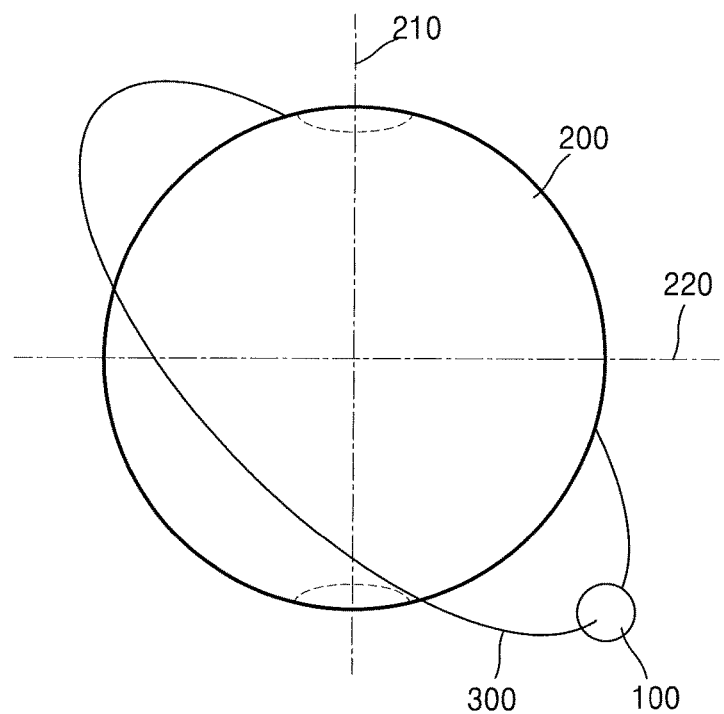
FIG. 1 is a schematic view illustrating an inclined orbit satellite according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The inventive concept may be variously modified, and various embodiments may be provided according to the inventive concept. Hereinafter, some embodiments will be illustrated in the accompanying drawings and described in detail. Effects and features of the inventive concept, and implementation methods thereof will be clarified through the following embodiments described with reference to the accompanying drawings. However, the inventive concept is not limited to the following embodiments but may be implemented in various forms. The terms of a singular form may include plural forms unless referred to the contrary. In addition, terms such as "include" or "comprise" specify features or the presence of stated elements, but do not exclude other features or elements.

Hereinafter, the embodiments will be described in detail with reference to the accompanying drawings. In the drawings, like reference numerals denote like elements, and overlapping descriptions thereof will be omitted.

FIG. 1 is a schematic view illustrating a satellite 100.

Referring to FIG. 1, the satellite 100 revolves around the Earth 200 in an orbital plane 300 having an angle with the equatorial plane of the Earth 200. The orbital plane 300 is an inclined orbital plane at an angle to the equatorial plane of the earth 200.

A first reference axis 210 indicates the axis of rotation of the Earth 200, and a second reference axis 220 indicates an axis included in the equatorial plane of the Earth 200.

The orbital plane 300 of the satellite 100 includes an orbit in which the satellite 100 moves, and the orbit may be circular or elliptical. The orbital period, a time period necessary for a satellite to revolve along an orbit once, is proportional to the size of the orbit. The orbit of the satellite 100 may be referred to as an equatorial orbit, an inclined orbit, or a polar orbit according to the angle between the orbital plane 300 and the equator of the Earth 200. The orbit of the satellite 100 is referred to as an equatorial orbit when the angle between the equator of the Earth 200 and the orbital plane 300 is zero, and as a polar orbit when the angle is 90 degrees. An orbit between the equatorial orbit and the polar orbit is referred to as an inclined orbit.

The satellite 100 may be a low earth orbit satellite configured to capture ground images. The orbits of most low earth orbit satellites are determined based on required revisitation periods. Features of orbits include altitude, inclination angle, and average local time. If the inclination angle of an orbit is not a right angle, the orbit makes an inclined angle with the equator. A satellite that moves along such an orbit is called an inclined orbit satellite. The satellite 100 may be an inclined orbit satellite. In this case, due to the inclined orbit of the satellite 100 and the effect of rotation of the Earth 200, there is an angle between the proceeding direction of the satellite 100 and the direction of a ground trace of the satellite 100. Thus, images of a ground surface captured by the satellite 100 may have a certain angular difference based on the due north direction.

Figure 2:
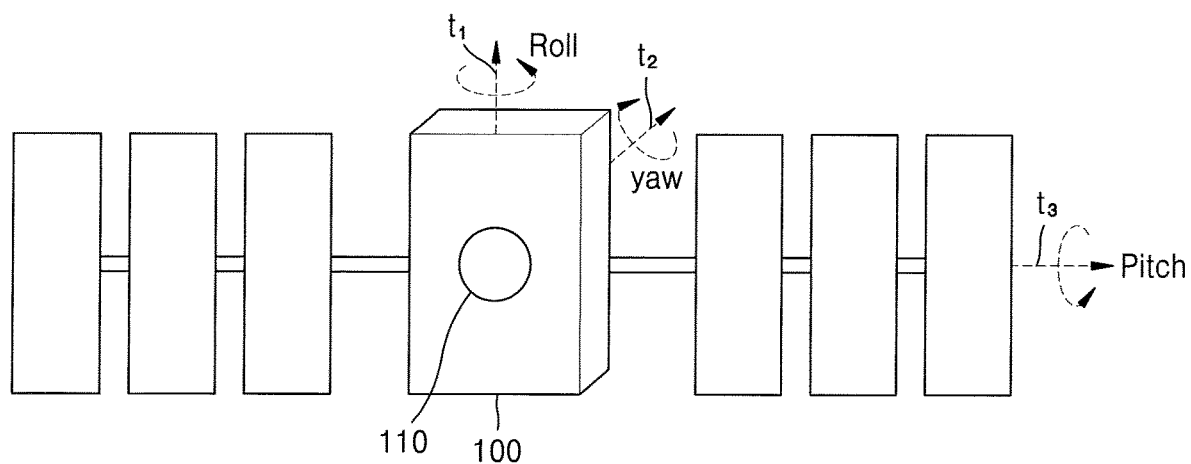
FIG. 2 is a schematic view illustrating the satellite according to an embodiment.

FIG. 2 is a schematic view illustrating the satellite 100 according to an embodiment.

Referring to FIG. 2, the satellite 100 may rotate on a roll axis t1, a pitch axis t3, or a yaw axis t2. Rotation of the satellite 100 on the roll axis t1 is referred to as rolling, rotation of the satellite 100 on the pitch axis t3 is referred to as pitching, and rotation of the satellite 100 on the yaw axis t2 is referred to as yawing. The amount of rolling of the satellite 100 is referred to as a roll angle $\phi$, the amount of pitching of the satellite 100 is referred to as a pitch angle $\theta$, and the amount of yawing of the satellite 100 is referred to as a yaw angle $\psi$.

A photographing device 110 is an optical device for capturing images of the surface of the Earth 200. The photographing device 110 may capture an image of a certain region of the surface of the Earth 200 with a preset exposure time. The photographing device 110 may capture images by a two-dimensional photographing method or a method of one-dimensionally scanning a ground surface. The photographing device 110 may include a solid-state imaging element such as a charge-coupled device (CCD) image sensor or a complementary metal-oxide semiconductor (CMOS) image sensor. However, the inventive concept is not limited thereto. That is, the photographing device 110 may be any device capable of photographing a certain region. In the embodiment, the photographing device 110 is not limited to the location illustrated in FIG. 2. That is, the photographing device 110 may be placed at any location.

The satellite 100 may photograph a photographing point for several seconds to several minutes.

A line-of-sight vector of the satellite 100 may be moved to a ground surface located at a photographing target position (hereinafter, referred to as a photographing point) as the roll angle $\phi$ and pitch angle $\theta$ of the satellite 100 are adjusted. The line-of-sight vector of the satellite 100 is parallel with the yaw axis t2 and has a direction toward a ground surface. The photographing device 110 may photograph a ground surface to which the line-of-sight vector is pointed. The direction of the line-of-sight vector may vary according to the roll angle $\phi$ or pitch angle $\theta$ of the satellite 100. That is, the direction of the line-of-sight vector varies depending on adjustment of the roll angle $\phi$ or pitch angle $\theta$ of the satellite 100.

In addition, the satellite 100 may photograph the surface of a planet other than the Earth at a certain inclination angle from the equatorial plane of the planet. That is, embodiments provide a method of controlling a satellite for capturing images in the due north direction, and the method may be applied to other planets as well as the Earth. However, the following description will be presented mainly based on the case in which the satellite 100 revolves around the Earth with an inclination angle from the equatorial plane of the Earth.

Figure 3A:
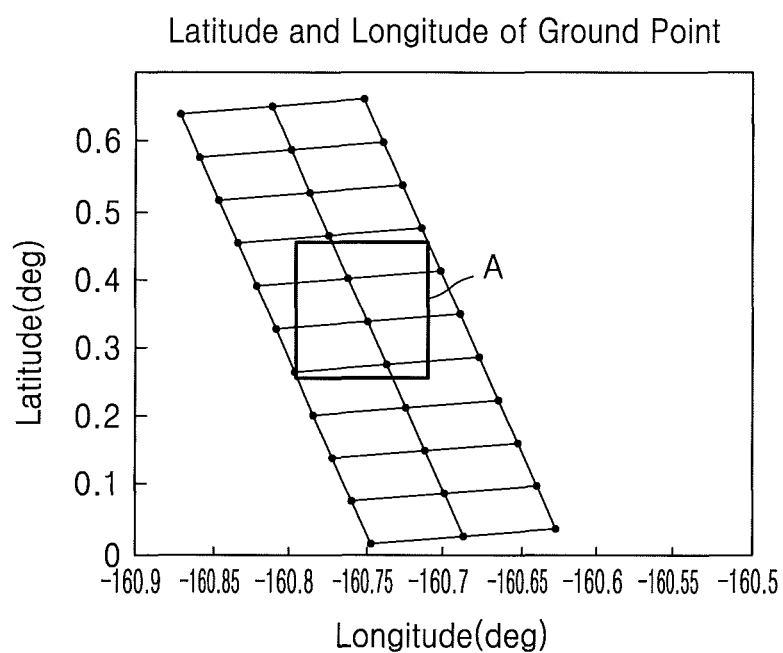
FIG. 3A schematically shows general image captured by the satellite without considering the rotation of the Earth and the inclination angle of the orbit of the satellite.
Figure 3B:
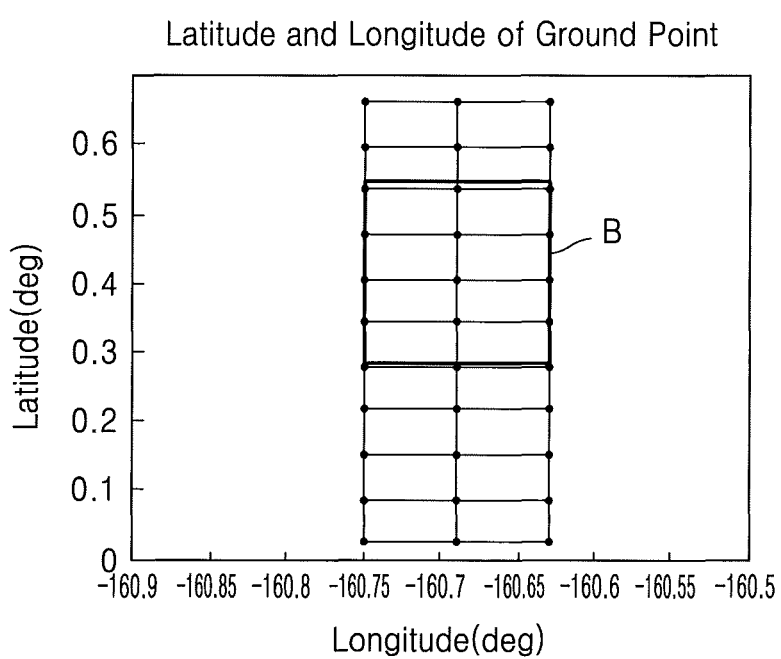
FIG. 3B schematically shows north directional image captured by the satellite considering the rotation of the Earth and the inclination angle of the orbit of the satellite.

FIG. 3A schematically shows general image captured by the satellite without considering the rotation of the Earth and the inclination angle of the orbit of the satellite. FIG. 3B schematically shows north directional image captured by the satellite considering the rotation of the Earth and the inclination angle of the orbit of the satellite.

Referring to FIGS. 3A and 3B, the vertical axis refers to latitude, and the horizontally axis refers to longitude. A region having a lattice shape (hereinafter, referred to as a first image) is obtained by arranging images captured by the satellite 100 according to the latitude and longitude. The first image has a parallelogram shape inclined at an angle from a longitude line.

When the satellite 100 revolves along an orbit having an inclination angle, images are not captured in the due north direction because of the rotation of the Earth, the inclination angle of the orbit, etc. Therefore, images captured by the satellite 100 are inclined like the first image.

A due-north image A having a quadrangle shape within a certain longitude range and a latitude range may be obtained from the first image. In this case, however, the size or resolution of the due-north image A is limited. For example, a due-north image A having a quadrangle shape may be obtained by trimming edge regions of images captured by the satellite 100. In this case, the resolution of the due-north image A is lower than the resolution of the photographing device 110. However, a due-north image B having a quadrangle shape may be obtained by due-north direction imaging of the satellite 100. In this case, the resolution of the due-north image B is the same as the resolution of the photographing device 110.

Figure 4:
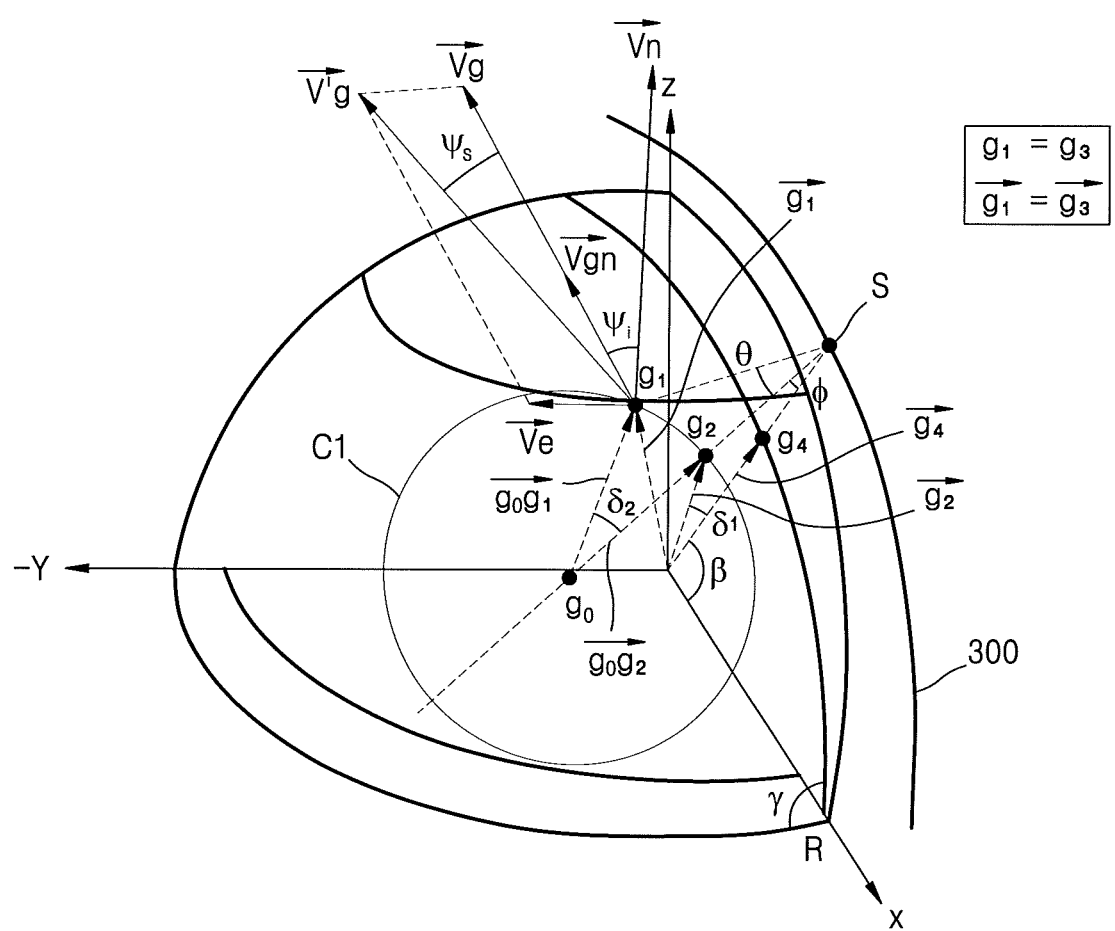
FIG. 4 is a schematic coordinate view illustrating a portion of the Earth and a ground trace of the satellite in an XYZ coordinate system to explain a relationship between the portion of the Earth and the satellite according to an embodiment.

FIG. 4 is a schematic coordinate view illustrating a portion of the Earth 200 and a ground trace of the satellite 100 in an XYZ coordinate system to explain a relationship between the portion of the Earth 200 and the satellite 100 according to an embodiment.

Referring to FIG. 4, the XYZ coordinate system has the origin at the center of the Earth 200, the Z-axis along the axis of rotation of the Earth 200, and an XY plane including the equatorial plane of the Earth 200. In the coordinate view, the Earth 200 having a radius R is partially schematically illustrated, and the orbital plane 300 formed by the orbit of the satellite 100 has an inclination angle $\gamma$ from the XY plane. For ease of illustration, it is assumed in the following description that the satellite 100 points to the center of the Earth 200 (nadir pointing) and a first position vector is calculated by considering the line-of-sight vector of the satellite 100 varied by the adjustment of the roll angle $\phi$ and then by the adjustment of the pitch angle $\theta$.

A roll angle $\phi$ and a pitch angle $\theta$ for adjusting the satellite 100 to a photographing point may be previously calculated.

In this case, information about the position of the satellite 100 such as altitude, latitude, and longitude are first obtained, and then the roll angle $\phi$ and the pitch angle $\theta$ for pointing the line-of-sight vector of the satellite 100 to the photographing point are calculated based on the information about the position of the satellite 100.

A first position point S refers to the position of the satellite 100. A first ground surface refers to a ground surface to be photographed by the satellite 100. A second ground surface refers to a ground surface that the line-of-sight vector of the satellite 100 meets after the roll angle $\phi$ of the satellite 100 is adjusted. A third ground surface refers to a ground surface that the line-of-sight vector of the satellite 100 meets after the pitch angle $\theta$ of the satellite 100 is adjusted in a state in which the roll angle $\phi$ of the satellite 100 is fixed. A fourth ground surface refers to a ground surface that the line-of-sight vector of the satellite 100 meets when the line-of-sight vector of the satellite 100 points to the center of the Earth 200. That is, the fourth ground surface is a nadir point of the satellite 100.

A first ground point $g_1$ includes information about the first ground surface, a second ground point $g_2$ includes information about the second ground surface, a third ground point $g_3$ includes information about the third ground surface, and a fourth ground point $g_4$ includes information about the fourth ground surface.

A reference point $g_0$ is a point on the line-of-sight vector of the satellite 100 pointing to the second ground point $g_2$. When the line-of-sight vector of the satellite 100 points to the second ground point $g_2$, a center point between two ground surfaces meeting the line-of-sight vector of the satellite 100 is the reference point $g_0$.

A first position vector $\vec{g_1}$ is a position vector pointing from the center of the Earth 200 to the first ground point $g_1$. A second position vector $\vec{g_2}$ is a position vector pointing from the center of the Earth 200 to the second ground point $g_2$. A third position vector $\vec{g_3}$ is a position vector pointing from the center of the Earth 200 to the third ground point $g_3$, and a fourth position vector $\vec{g_4}$ is a position vector pointing from the center of the Earth 200 to the fourth ground point $g_4$. For ease of illustration, the following description is presented under the assumption that a position vector of a ground surface or ground point refers to a vector pointing from the center of the Earth 200 to the ground surface or ground point.

A first circle C1 involves a ground trace drawn by the line-of-sight vector of the satellite 100 while the pitch angle $\theta$ of the satellite 100 is adjusted. As the pitch angle $\theta$ of the satellite 100 is adjusted, the line-of-sight vector of the satellite 100 moves along the first circle C1.

A first parameter $\beta$ is an angle between the X-axis and a vector pointing from the origin to the satellite 100. The first parameter $\beta$ varies according to the revolution of the satellite 100 and is linear with time.

An inclination angle $\gamma$ of the orbit of the satellite 100 refers to an angle between the equatorial plane of the Earth 200 and the orbital plane 300. The inclination angle $\gamma$ may be an angle between the XY plane and the orbital plane 300.

A first angle $\delta_1$ is an angle between a position vector of a ground surface meeting the line-of-sight vector of the satellite 100 before the satellite 100 is adjusted to a determined roll angle $\phi$ and a position vector of a ground surface meeting the line-of-sight vector of the satellite 100 after the satellite 100 is adjusted to the determined roll angle $\phi$. The first angle $\delta_1$ varies according to the roll angle $\phi$. That is, an equation representing a relationship between the roll angle $\phi$ and the first angle $\delta_1$ may be derived to calculate the first angle $\delta_1$ corresponding to the determined roll angle $\phi$. The second position vector $\vec{g_2}$ varied by adjustment to the determined roll angle $\phi$ may be calculated using the calculated first angle $\delta_1$.

A second angle $\delta_2$ is an angle between a second reference vector $\vec{g_0 g_2}$ and a first reference vector $\vec{g_0 g_1}$, wherein the second reference vector $\vec{g_0 g_2}$ is a vector pointing from the reference point $g_0$ to a ground surface that the line-of-sight vector of the satellite 100 meets before the satellite 100 is adjusted to a determined pitch angle $\theta$, and a first reference vector $\vec{g_0 g_1}$ is a vector pointing from the reference point $g_0$ to a ground surface that the line-of-sight vector of the satellite 100 meets after the satellite 100 is adjusted to the determined pitch angle $\theta$. The second angle $\delta_2$ varies according to the pitch angle $\theta$. That is, the third position vector $\vec{g_3}$ after the adjustment of the pitch angle $\theta$ may be calculated by deriving an equation about a relationship between the pitch angle $\theta$ and the second angle $\delta_2$ and calculating the second angle $\delta_2$ corresponding to the determined pitch angle $\theta$ using the equation.

A first velocity unit vector $\vec{v_{gn}}$ is a unit vector obtained by differentiating the first position vector $\vec{g_1}$ with respect to the first parameter $\beta$ and normalizing the derivative of the first position vector $\vec{g_1}$. The first velocity unit vector $\vec{v_{gn}}$ includes information about the proceeding direction of the satellite 100. A first velocity vector $\vec{v_g}$ is a product of the revolution speed of the satellite 100 and the first velocity unit vector $\vec{v_{gn}}$. A first direction vector $\vec{v_z}$ is a vector indicating the Z-axis. A first unit vector $\vec{g_n}$ is a vector obtained by normalizing the first position vector $\vec{g_1}$.

A second direction vector $\vec{v}_{ne}$ (see FIG. 10.) is the cross product of the first unit vector $\vec{g}_n$ and the first direction vector $\vec{v}_z$. The second direction vector $\vec{v}_{ne}$ is tangential to the first ground point $g_1$ and includes information about the direction of movement of the surface of the Earth 200 by the rotation of the Earth 200. A third velocity vector $\vec{v}_e$ is a vector obtained by multiplying the second direction vector $\vec{v}_{ne}$ by the speed of a surface of the Earth 200 rotating on its axis. The third velocity vector $\vec{v}_e$ is a velocity vector of a surface of the Earth 200 rotating on its axis. A second velocity vector $\vec{vg'}$ is a vector obtained by adding the first velocity vector $\vec{v}_g$ and the third velocity vector $\vec{v}_e$.

A third direction vector $\vec{v}_n$ (see FIG. 10.) is the cross product of the second direction vector $\vec{v}_{ne}$ and the first unit vector $\vec{g}_n$. The third direction vector $\vec{v}_n$ is tangential to the first ground point $g_1$ and points due north.

A first compensation angle $\psi_s$ is an angle between the first velocity vector $\vec{v}_g$ and the second velocity vector $\vec{vg'}$. A second compensation angle $\psi_i$ is an angle between the first velocity vector $\vec{v}_g$ and the third direction vector $\vec{v}_n$.

The first position point S and the fourth ground point $g_4$ may be expressed by a function of the first parameter $\beta$. In addition, the first to third ground points $g_1$ to $g_3$ may be calculated based on the first angle $\delta_1$, the second angle $\delta_2$, and the first parameter $\beta$, and the first to third ground points $g_1$ to $g_3$ may be expressed by an equation including the first angle $\delta_1$, the second angle $\delta_2$, and the first parameter $\beta$.

That is, the first position vector $\vec{g}_1$ may be expressed by a mathematical function of the first parameter $\beta$ based on rotation of coordinates by the first angle $\delta_1$, the second angle $\delta_2$, and the first parameter $\beta$, and a velocity unit vector of the first ground point $g_1$ may be simply calculated by differentiating the first position vector $\vec{g}_1$ with respect to the first parameter $\beta$.

In addition, the misalignment angle between the proceeding direction of the satellite 100 and the direction of the ground trace of the satellite 100 may be estimated based on the direction of the velocity unit vector of the first ground point $g_1$. The ground trace may be a path pointing to due north from the photographing point. A method of changing the yaw angle $\psi$ based on the misalignment angle may be considered for photography in the due north direction. That is, although the satellite 100 moves in a path having a misalignment angle with respect to the direction the ground trace, if the yaw angle $\psi$ of the satellite 100 is adjusted, the direction of images captured by the photographing device 110 may be due north. That is, so as to capture due-north images using an inclined orbit satellite 100, it may be necessary to adjust the yaw angle $\psi$ of the satellite 100 based on an angular difference between the proceeding direction of the satellite 100 and the direction of the ground trace caused by the effect of rotation of the Earth 200 and the inclination angle $\gamma$. Hereinafter, processes of determining a compensation angle ($\psi_c$) for the yaw angle $\psi$ based on a misalignment angle will be described.

Figure 5:
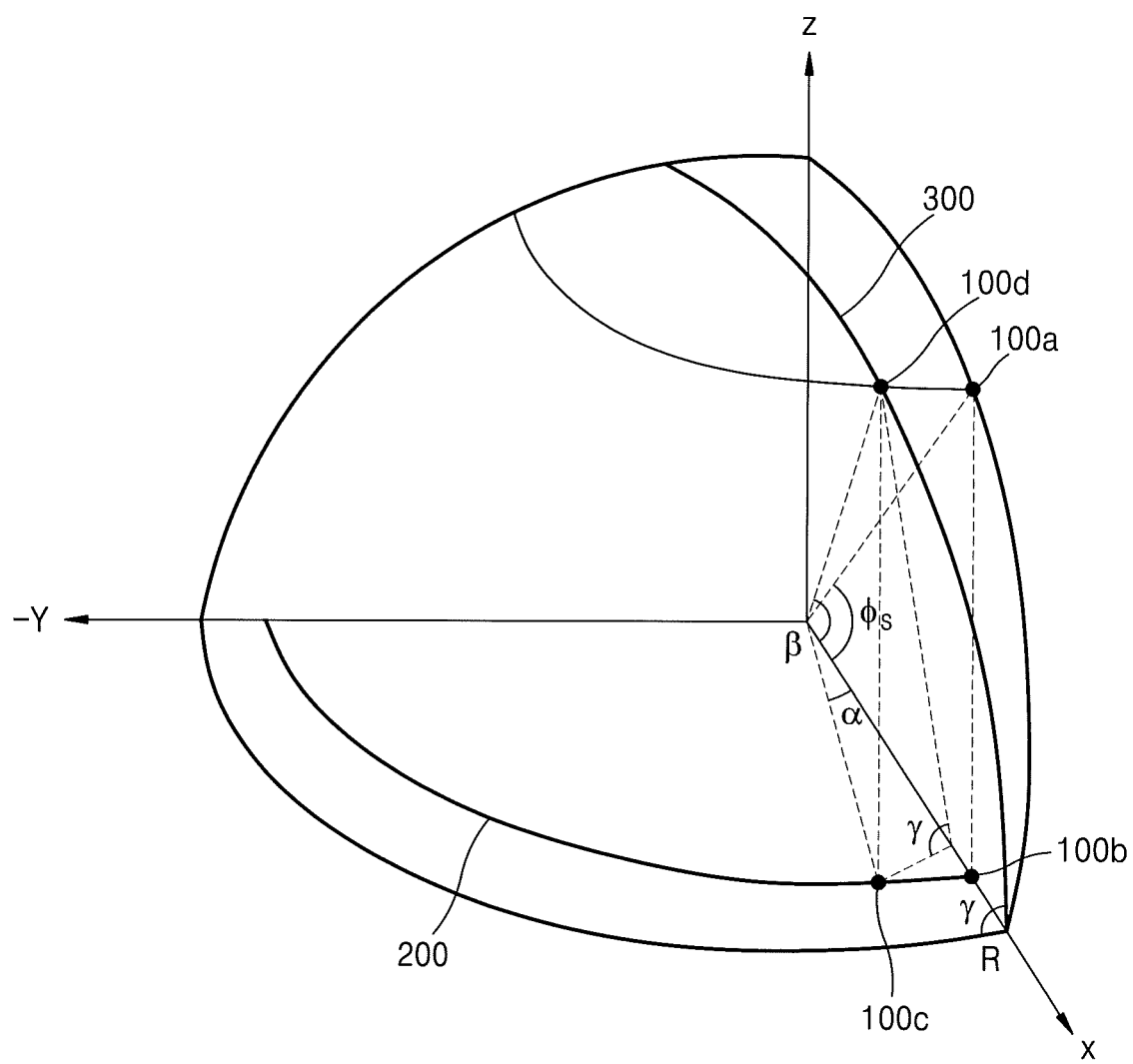
FIG. 5 is a schematic coordinate view illustrating a portion of the Earth in an XYZ coordinate system to explain a method of defining a first parameter according to an embodiment.

FIG. 5 is a coordinate view schematically illustrating a portion of the Earth 200 in an XYZ coordinate system to describe a method of defining a first parameter according to an embodiment.

Referring to FIG. 5, the XYZ coordinate system has the origin at the center of the Earth 200 and the Z-axis along the axis of rotation of the Earth 200. In the coordinate view, the Earth 200 having a radius R is partially illustrated, an XY plane is parallel with the equatorial plane of the Earth 200, and an orbital plane 300 formed by an orbit of the satellite 100 has an inclination angle $\gamma$ with the XY plane.

A first point 100$d$ is a point on the surface of the Earth 200 that the line-of-sight vector of the satellite 100 meets when pointing to the center of the Earth 200. The first point 100$d$ lies on a circumferential circle having a radius R and inclined from the XY plane by an inclination angle $\gamma$. A second point 100$a$ is a point at which an XZ plane meets a circle having a center on the Z-axis and passing through the first point 100$d$ in parallel with the XY plane. A third point 100$c$ is a point at which the first point 100$d$ is projected on the XY plane, and a fourth point 100$b$ is a point at which the second point 100$a$ is projected on the XY plane.

A first included angle $\alpha$ is an angle between the X-axis and a vector pointing from the origin to the third point 100$c$. A second included angle $\phi_s$ is an angle between the X-axis and a vector pointing from the origin to the second point 100$a$. The second included angle $\phi_s$ is the latitude of the position of the satellite 100.

The coordinate of the first point 100$d$ may be obtained by rotating a point $[R\ 0\ 0]^T$. The coordinate of the first point 100$d$ may be obtained by rotating the point $[R\ 0\ 0]^T$ by the second included angle $-\phi_s$ in a negative direction about the Y-axis and then by the first included angle $-\alpha$ in a negative direction about the Z-axis. Alternatively, the coordinate of the first point 100$d$ may be obtained by rotating the point $[R\ 0\ 0]^T$ by the first parameter $-\beta$ in a negative direction about the Y-axis and then by an angle 90°—$\gamma$ (90°—the inclination angle $\gamma$) about the X-axis. The following equation has the coordinates of the first point 100$d$ obtained by the above two methods on both sides.

$$\begin{bmatrix} \cos(\alpha) & \sin(\alpha) & 0 \\ -\sin(\alpha) & \cos(\alpha) & 0 \\ 0 & 0 & 1 \end{bmatrix} \begin{bmatrix} \cos(\phi_s) & 0 & -\sin(\phi_s) \\ 0 & 1 & 0 \\ \sin(\phi_s) & 0 & \cos(\phi_s) \end{bmatrix}$$

$$\begin{bmatrix} R \\ 0 \\ 0 \end{bmatrix} = \begin{bmatrix} 1 & 0 & 0 \\ 0 & \sin(\gamma) & -\cos(\gamma) \\ 0 & \cos(\gamma) & \sin(\gamma) \end{bmatrix} \begin{bmatrix} \cos(\beta) & 0 & -\sin(\beta) \\ 0 & 1 & 0 \\ \sin(\beta) & 0 & \cos(\beta) \end{bmatrix} \begin{bmatrix} R \\ 0 \\ 0 \end{bmatrix}$$

The above matrix multiplications are calculated as follows.

$$\begin{bmatrix} \cos(\alpha)\sin(\phi_s) \\ -\sin(\alpha)\cos(\phi_s) \\ \sin(\phi_s) \end{bmatrix} = \begin{bmatrix} \cos(\beta) \\ -\cos(\gamma)\sin(\beta) \\ \sin(\gamma)\sin(\beta) \end{bmatrix}$$

Since the third rows of the matrices of the equation are equal, the first parameter $\beta$ may be expressed by a function of the second included angle $\phi_s$ and the inclination angle $\gamma$ as follows.

$$\beta = \sin^{-1}\left(\frac{\sin(\phi_s)}{\sin(\gamma)}\right)$$

The equation expressing the first parameter $\beta$ may be derived without using rotation matrices by using the fact that the linear distance from the first point 100*d* to the third point 100*c* is equal to the linear distance from the second point 100*a* to the fourth point 100*b*. The linear distance from the second point 100*a* to the fourth point 100*b* is R sin($\phi_s$). The angle between the XY plane and a perpendicular line drawn from the first point 100*d* to the X-axis is equal to the inclination angle γ. In this case, the length of the perpendicular line is R sin(β), and the linear distance from the first point 100*d* to the third point 100*c* is equal to the product of sin(γ) and the length of the perpendicular line. This relationship may be expressed by the following equation.

$$R \sin(\phi_s) = R \sin(\beta)\sin(\gamma)$$

If this equation is solved for the first parameter β, the same equation as the above equation is obtained.

Since the first parameter β is a variable linearly varying with time, the velocity unit vector of the first position vector $\vec{g_1}$ pointing from the center of the Earth 200 to a ground surface that the line-of-sight vector of the satellite 100 meets may be calculated by expressing the first position vector $\vec{g_1}$ as a function of the first parameter β and differentiating the first position vector $\vec{g_1}$ with respect to the first parameter β.

Hereinafter, a method of deriving an equation expressing a functional relationship between the first position vector $\vec{g_1}$ and the first parameter β will be described.

Figure 6:
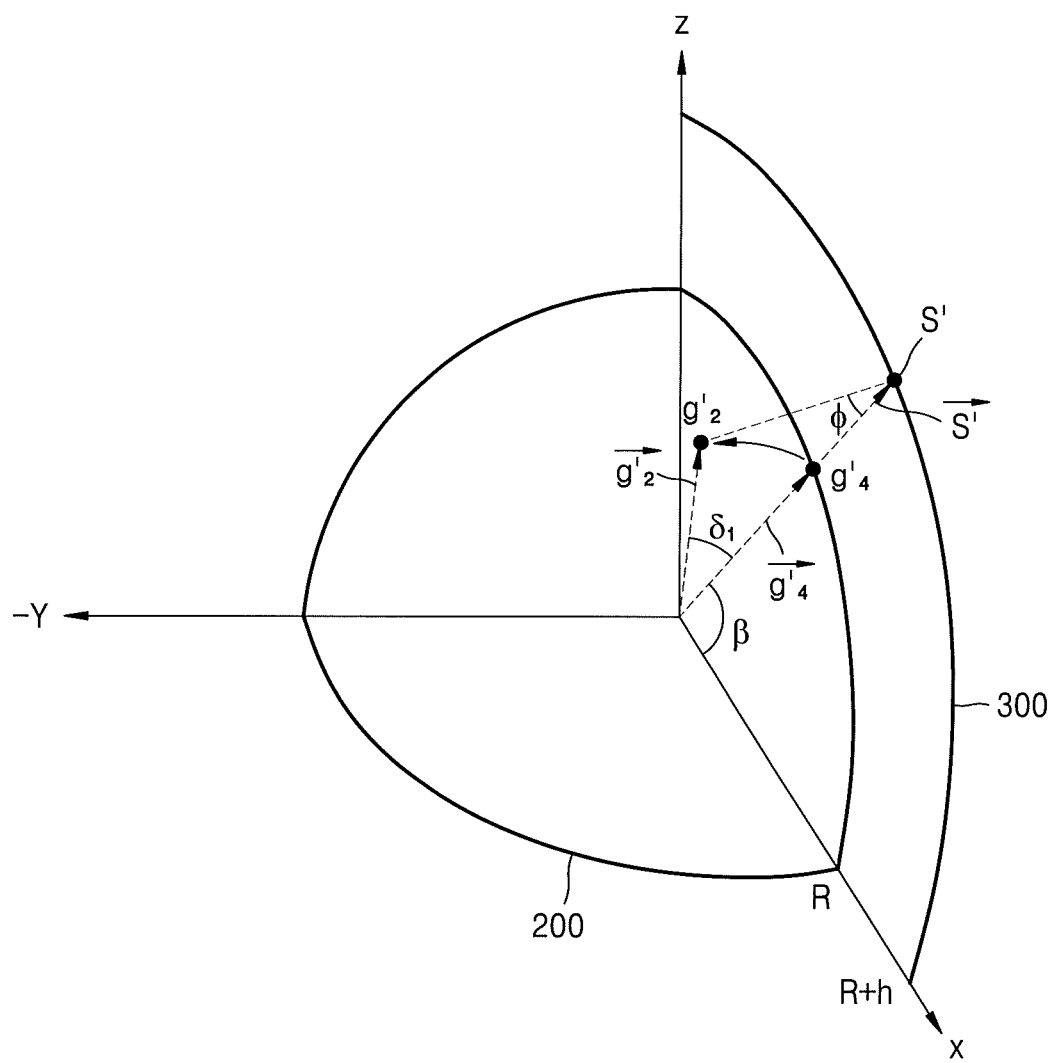
FIG. 6 is a schematic coordinate view illustrating a portion of the Earth 200 and the satellite 100 in an XYZ coordinate system to explain a position vector of a ground surface meeting a line-of-sight vector of the satellite as the roll angle of the satellite is adjusted according to an embodiment.

FIG. 6 is a coordinate view schematically illustrating a portion of the Earth 200 and the satellite 100 in an XYZ coordinate system to describe a positional relationship between the portion of the Earth 200 and the satellite 100 according to an embodiment.

Referring to FIG. 6, an orbital plane 300 of the satellite 100 is in an XZ plane, and the center of the Earth 200 is the origin. In the coordinate view, a portion of the Earth 200 having a radius R and the satellite 100 revolving at an altitude h are schematically illustrated. For ease of illustration, it is assumed in the following description that the orbital plane 300 of the satellite 100 is in the XZ plane and the satellite 100 points to the center of the Earth 200 (nadir pointing).

A position vector $\vec{s'}$ of the satellite 100 points from the center of the Earth 200 to a first position point S'. The position vector $\vec{s'}$ of the satellite 100 has the same direction as the unit vector of a fourth position vector $\vec{g_4'}$ (refer to $\vec{g_4}$ in FIG. 4) but different in length from the fourth position vector $\vec{g_4'}$. Therefore, the position vector $\vec{s'}$ of the satellite 100 may be calculated using the fourth position vector $\vec{g_4'}$ having a functional relationship with a first parameter β.

A point (R, 0, 0) is rotated by the first parameter −β in a negative direction around the Y-axis so as to express the fourth position vector $\vec{g_4'}$ using the first parameter β. The fourth position vector $\vec{g_4'}$ may be calculated using an equation having the first parameter β as a variable. In this case, the fourth position vector $\vec{g_4'}$ may be expressed as follows.

$$\vec{g_4'} = \begin{bmatrix} \cos(\beta) & 0 & -\sin(\beta) \\ 0 & 1 & 0 \\ \sin(\beta) & 0 & \cos(\beta) \end{bmatrix} \begin{bmatrix} R \\ 0 \\ 0 \end{bmatrix} = \begin{bmatrix} R\cos(\beta) \\ 0 \\ R\sin(\beta) \end{bmatrix}$$

The position of the satellite 100 may be expressed by the first parameter β using the fourth position vector $\vec{g_4'}$. For example, the position vector $\vec{s'}$ of the satellite 100 may be calculated based on the fourth position vector $\vec{g_4'}$ and a ratio of the sum of the radius R of the Earth 200 and the altitude h of the satellite 100 to the radius R of the Earth 200.

$$\vec{s'} = \vec{g_4'} \frac{R+h}{R}$$

Next, a relationship between the roll angle φ determined in FIG. 4 and a first angle $\delta_1$ is derived. Since the first angle $\delta_1$ has a relationship with the roll angle φ, the first angle $\delta_1$ corresponding to the determined roll angle φ may be calculated. An equation for a second position vector $\vec{g_2'}$ may be obtained by rotating the fourth position vector $\vec{g_4'}$ by the calculated first angle $\delta_1$ in a plane (hereinafter, referred to as a first plane) crossing an XY plane at the Y-axis and inclined by the first parameter β from the XY plane.

The relationship between the first angle $\delta_1$ and the roll angle φ may be derived using trigonometry as follows.

$$\frac{R}{\sin(\phi)} = \frac{R+h}{\sin(\phi+\delta_1)}$$

$$\delta_1 = \sin^{-1}\left(\frac{R+h}{R}\sin(\phi)\right) - \phi$$

Next, the first angle $\delta_1$ corresponding to the determined roll angle φ is calculated using the relationship between the roll angle φ and the first angle $\delta_1$. When the satellite 100 is adjusted using the determined roll angle φ, the second position vector $\vec{g_2'}$ may be calculated as follows by rotating the point (R, 0, 0) by the first angle $-\delta_1$ in a negative direction around the Z-axis and by the first parameter −β in a negative direction around the Y-axis.

$$\vec{g_2'} = \begin{bmatrix} \cos(\beta) & 0 & -\sin(\beta) \\ 0 & 1 & 0 \\ \sin(\beta) & 0 & \cos(\beta) \end{bmatrix} \begin{bmatrix} \cos(\delta_1) & \sin(\delta_1) & 0 \\ -\sin(\delta_1) & \cos(\delta_1) & 0 \\ 0 & 0 & 1 \end{bmatrix} \begin{bmatrix} R \\ 0 \\ 0 \end{bmatrix} = \begin{bmatrix} R\cos(\beta)\cos(\delta_1) \\ -R\sin(\delta_1) \\ R\sin(\beta)\cos(\delta_1) \end{bmatrix}$$

In this case, the second position vector $\vec{g_2'}$ is calculated by an equation including the first angle $\delta_1$ and the first parameter β. Since the determined roll angle φ is a constant, the first angle $\delta_1$ is also a constant, and thus the equation is derived as a function of the first parameter β.

Figure 7:
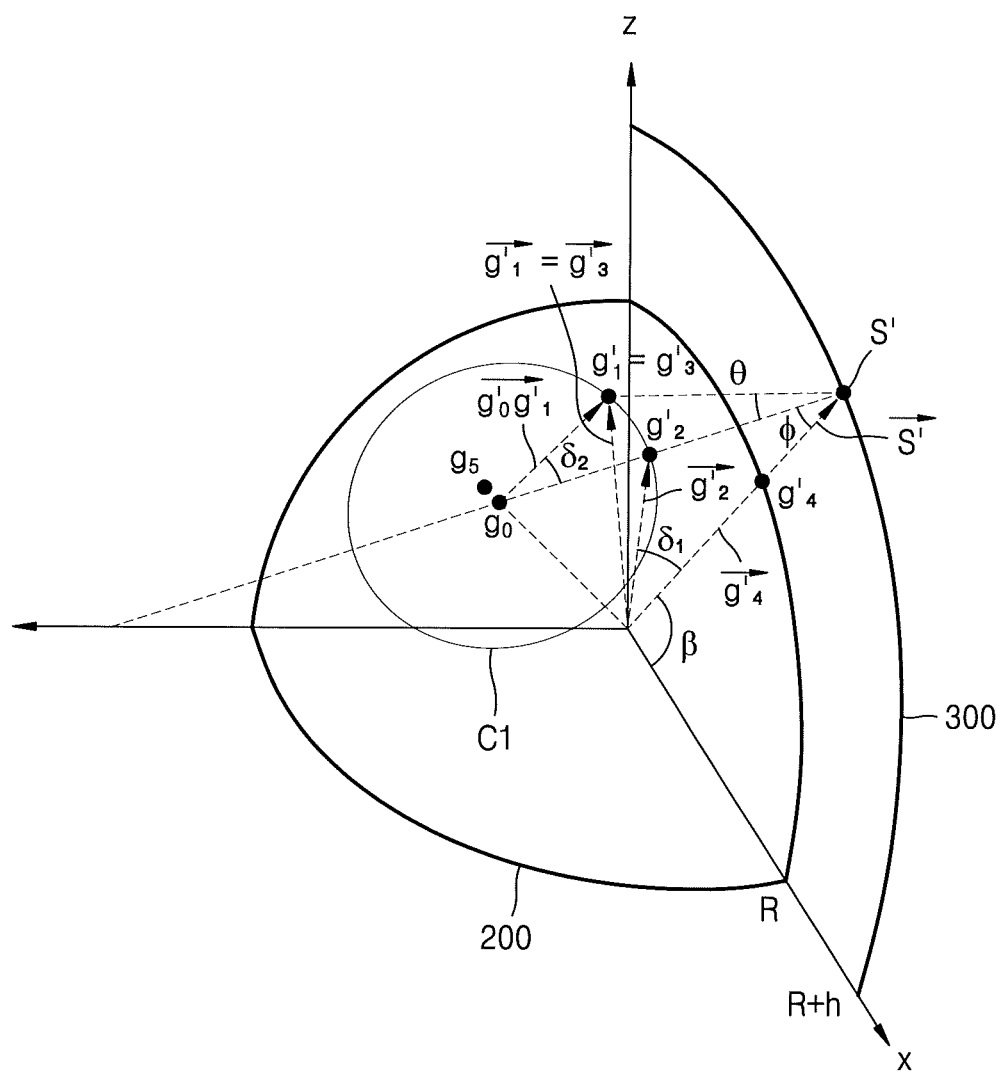
FIG. 7 is a schematic coordinate view illustrating a portion of the Earth and the satellite in an XYZ coordinate system to explain a position vector of a ground surface meeting the line-of-sight vector of the satellite as the pitch angle of the satellite is adjusted according to an embodiment.
Figure 8:
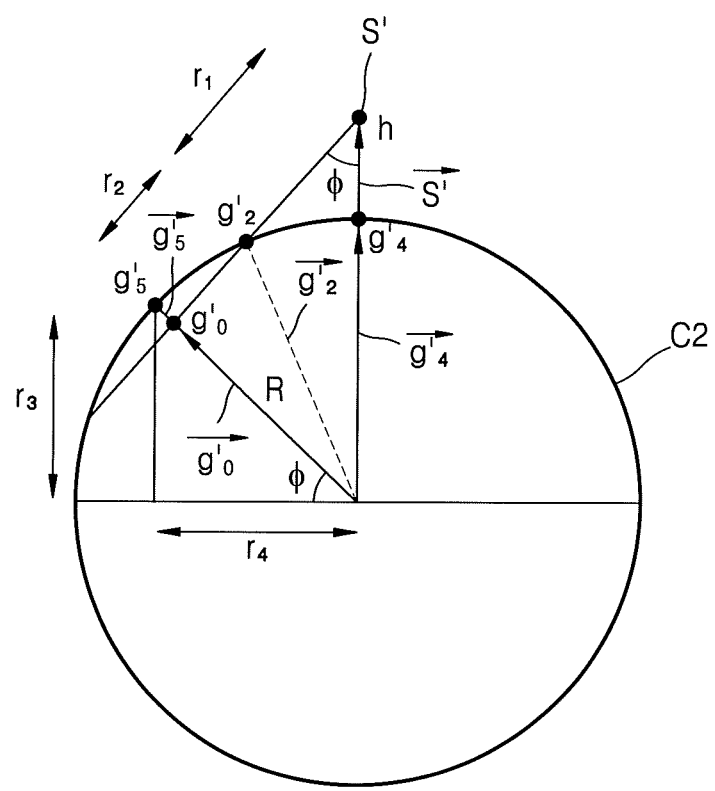
FIG. 8 is a schematic view illustrating a plane that crosses an XY plane along the Y-axis in the XYZ coordinate system shown in FIG. 7, the plane being inclined by a first parameter β from the XY plane.
Figure 9:
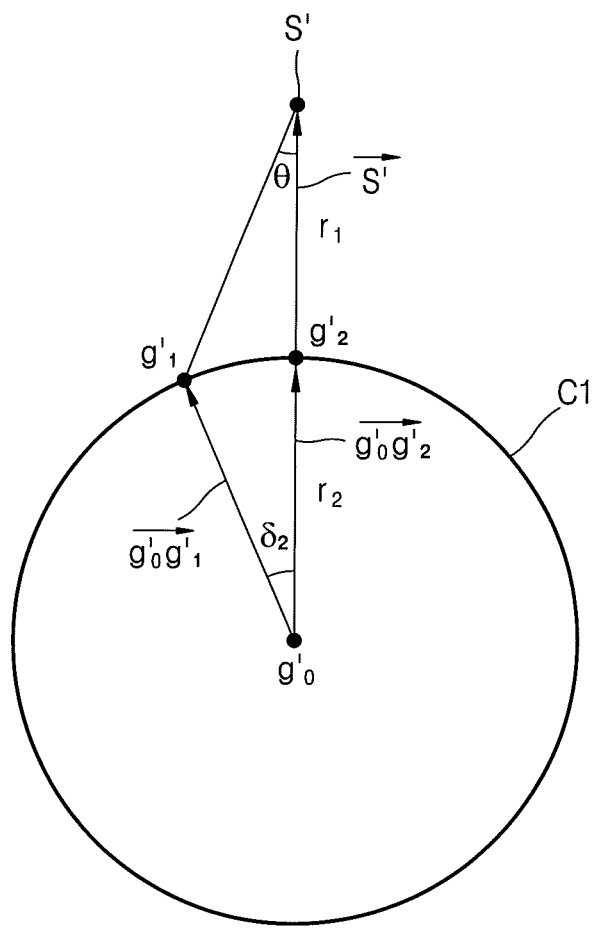
FIG. 9 is a schematic view illustrating a plane including a third ground point, a reference point, and a second ground point in the embodiment shown in FIG. 7.

FIG. 7 is a schematic coordinate view illustrating a portion of the Earth 200 and the satellite 100 in an XYZ coordinate system to explain a position vector of a ground surface that the line-of-sight vector of the satellite 100 meets as the pitch angle θ of the satellite 100 is adjusted according to an embodiment. FIG. 8 is a schematic view illustrating a plane that crosses an XY plane along the Y-axis in the XYZ coordinate system of the embodiment shown in FIG. 7, the plane being inclined by a first parameter β from the XY plane. FIG. 9 is a schematic view illustrating a plane including a third ground point, a reference point, and a second ground point in the embodiment shown in FIG. 7.

Referring to FIG. 7, an orbital plane 300 of the satellite 100 is in an XZ plane, and the center of the Earth 200 is the origin. In the coordinate view, a portion of the Earth 200 having a radius R and the satellite 100 revolving at an altitude h are schematically illustrated. Referring to FIG. 8, a second circle C2 drawn in the plane crossing the XY plane at the Y-axis and inclined from the XY plane by the first parameter β is a ground surface of the Earth 200 having a radius R. A straight line including a first position point S' representing the satellite 100 indicates the line-of-sight vector of the satellite 100. Referring to FIG. 9, a first circle C1 has a center at a reference point $g'_0$ and a radius equal to a second distance $r_2$, and the first position point S' is separated from the first circle C1 by a first distance $r_1$.

For ease of illustration, it is assumed in the following description that the orbital plane 300 of the satellite 100 is in the XZ plane, and the satellite 100 points to the center of the Earth 200 (refer to FIG. 7).

The first circle C1 has a radius centered at the reference point $g'_0$ (refer to FIG. 4). The reference point $g'_0$ is a point on a second position vector $\vec{g_2'}$, and when the line-of-sight vector of the satellite 100 points to the second ground surface, the reference point $g'_0$ is the center between two ground surfaces that the line-of-sight vector of the satellite 100 meets (refer to FIG. 7).

A second angle $\delta_2$ is an angle between a reference vector pointing from the reference point $g'_0$ to a ground surface that the line-of-sight vector of the satellite 100 meets before the pitch angle θ of the satellite 100 is adjusted, and a reference vector pointing from the reference point $g'_0$ to a ground surface that the line-of-sight vector of the satellite 100 meets after the pitch angle θ of the satellite 100 is adjusted. The second angle $\delta_2$ varies according to the pitch angle θ. A method of deriving a relationship between the second angle $\delta_2$ and the pitch angle θ will now be described with reference to FIG. 8.

A straight line passing through the first position point S' to a second ground point $g'_2$ meets a circle having a radius R at two points. A center point between the two points is the reference point $g'_0$. A straight line passing through the reference point $g'_0$ and the origin meets the circle at a fifth ground point $g'_5$.

The first distance $r_1$ is a distance between the first position point S' and the second ground point $g'_2$, and the second distance $r_2$ is a distance between the reference point $g'_0$ and the second ground point $g'_2$ (refer to FIG. 8).

A straight line extending from the origin to the fifth ground point $g'_5$ has a roll angle φ from the Y-axis. The coordinate of the fifth ground point $g'_5$ may be calculated using this relationship. The x-coordinate of the fifth ground point $g'_5$ is obtained by multiplying R sin(φ) by cos(β) because the length R sin(φ) is inclined by the first parameter β. Since the y-coordinate of the fifth ground point $g'_5$ corresponds to the length R cos(φ) in a negative Y-axis direction, the y-coordinate of the fifth ground point $g'_5$ is obtained by multiplying R cos(φ) by −1. The z-coordinate of the fifth ground point $g'_5$ is obtained by multiplying R sin(φ) by sin(β) because the length R sin(φ) is inclined by the first parameter β.

Thus, a position vector $\vec{g_5'}$ pointing to the coordinate of the fifth ground point $g'_5$ is as follows.

$$\vec{g_{5'}} = \begin{bmatrix} R\sin(\phi)\cos(\beta) \\ -R\cos(\phi) \\ R\sin(\phi)\sin(\beta) \end{bmatrix}$$

The first distance $r_1$ and the second distance $r_2$ are calculated using the fifth ground point $g'_5$ and the position vector $\vec{s'}$ of the satellite 100 as follows.

$$r_1 = \|\vec{s'} - \vec{g_{2'}}\|$$

$$r_2 = R\cos(\phi + \delta_1)$$

The second angle $\delta_2$ at the reference point $g'_0$ is calculated using trigonometry as follows (refer to FIG. 9).

$$\frac{r_2}{\sin(\theta)} = \frac{r_1 + r_2}{\sin(\theta + \delta_2)}$$

$$\delta_2 = \sin^{-1}\left(\frac{r_1 + r_2}{r_2}\sin(\theta)\right) - \theta$$

A third position vector $\vec{g_3'}$ may be calculated using an Euler axis rotation method by rotating the second ground point $g'_2$ by the second angle $\delta_2$ around a unit vector of a position vector pointing from the center of the Earth 200 to the reference point $g'_0$. The unit vector pointing from the center of the Earth 200 toward the reference point $g'_0$ is obtained by dividing the position vector $\vec{g_5'}$ pointing from the center of the Earth 200 to the fifth ground point $g'_5$ by R.

Since a first ground point $g'_1$ is a ground surface that the line-of-sight vector of the satellite 100 meets after the roll angle φ and pitch angle θ of the satellite 100 are adjusted, a third ground point $g'_3$ corresponds to the first ground point $g'_1$, and the third position vector $\vec{g_3'}$ corresponds to the first position vector $\vec{g_1'}$. For ease of description, the following description is presented under the assumption that a position vector is calculated when the pitch angle θ of the satellite 100 is adjusted after the roll angle φ of the satellite 100 is adjusted. That is, the third position vector $\vec{g_3'}$ is described as the first position vector $\vec{g_1'}$, and the third ground point $g'_3$ is described as the first ground point $g'_1$.

The Euler axis rotation method defines a rotation matrix for rotation around a given vector as follows. For example, a rotation matrix for rotation by an angle θ around a unit vector $\vec{u} = (u_x, u_y, u_z)$ is as follows.

$$R = \begin{bmatrix} \cos(\theta) + u_x^2(1-\cos(\theta)) & u_x u_y(1-\cos(\theta)) - u_z\sin(\theta) & u_x u_z(1-\cos(\theta)) + u_y\sin(\theta) \\ u_x u_y(1-\cos(\theta)) + u_z\sin(\theta) & \cos(\theta) + u_y^2(1-\cos(\theta)) & u_y u_z(1-\cos(\theta)) - u_x\sin(\theta) \\ u_x u_z(1-\cos(\theta)) - u_y\sin(\theta) & u_y u_z(1-\cos(\theta)) + u_x\sin(\theta) & \cos(\theta) + u_z^2(1-\cos(\theta)) \end{bmatrix}$$

The following matrix $R_{g_2'}^{g_1'}$ may be obtained by substituting $\delta_2$, $\sin(\phi)\cos(\beta)$, $-\cos(\phi)$, and $\sin(\phi)\sin(\beta)$ for $\theta$, $u_x$, $u_y$, $u_z$ in the equation. The matrix $R_{g_2'}^{g_1'}$ shows a result of rotating the second ground point $g'_2$ by the second angle $\delta_2$ around a unit vector of a position vector pointing to the reference point $g'_0$ by the Euler axis rotation method. If the matrix $R_{g_2'}^{g_1'}$ is multiplied by the second position vector $\vec{g_2'}$, the first position vector $\vec{g_1'}$ is obtained.

Rows and columns of the matrix $R_{g_2'}^{g_1'}$ are as follows.

$R_{g_2'}^{g_1'}(1,1) = \sin^2(\phi)\cos^2(\beta)(1-\cos(\delta_2))+\cos(\delta_2)$ $R_{g_2'}^{g_1'}(1,2) = -\sin(\phi)\cos(\phi)\cos(\beta)(1-\cos(\delta_2))-\sin(\phi)\sin(\beta)\sin(\delta_2)$ $R_{g_2'}^{g_1'}(1,3) = \sin^2(\phi)\cos(\beta)\sin(\beta)(1-\cos(\delta_2))-\cos(\phi)\sin(\delta_2)$ $R_{g_2'}^{g_1'}(2,1) = -\sin(\phi)\cos(\phi)\cos(\beta)(1-\cos(\delta_2))+\sin(\phi)\sin(\beta)\sin(\delta_2)$ $R_{g_2'}^{g_1'}(2,2) = \cos^2(\phi)(1-\cos(\delta_2))+\cos(\delta_2)$ $R_{g_2'}^{g_1'}(2,3) = \sin(\phi)\cos(\phi)\sin(\beta)(1-\cos(\delta_2))-\sin(\phi)\cos(\beta)\sin(\delta_2)$ $R_{g_2'}^{g_1'}(3,1) = \sin^2(\phi)\cos(\beta)\sin(\beta)(1-\cos(\delta_2))+\cos(\phi)\sin(\delta_2)$ $R_{g_2'}^{g_1'}(3,2) = -\sin(\phi)\cos(\phi)\sin(\beta)(1-\cos(\delta_2))+\sin(\phi)\cos(\beta)\sin(\delta_2)$ $R_{g_2'}^{g_1'}(3,3) = \sin^2(\phi)\sin^2(\beta)(1-\cos(\delta_2))+\cos(\delta_2)$ $\vec{g_1'} = R_{g_2'}^{g_1'}\vec{g_2'}$ The first position vector $\vec{g_1'}$ may be calculated using the matrix including the first parameter $\beta$, the roll angle $\phi$, the pitch angle $\theta$, the first angle $\delta_1$, and the second angle $\delta_2$. If the roll angle $\phi$ and the pitch angle $\theta$ are determined, the first angle $\delta_1$ and the second angle $\delta_2$ are treated as constants, and thus the first position vector $\vec{g_1'}$ may be expressed by a function of the first parameter $\beta$. Hereinafter, processes of deriving a first velocity unit vector $\vec{v_{gn}'}$ by differentiating the first position vector $\vec{g_1'}$ with respect to the first parameter $\beta$ will be described.

The first position vector $\vec{g_1'}$ may be expressed by a function of the first parameter $\beta$. Since the first parameter $\beta$ is linear with time, the first velocity unit vector $\vec{v_{gn}'}$ may be obtained as follows by differentiating the first position vector $\vec{g_1'}$ with respect to the first parameter $\beta$ and normalizing the derivative of the first position vector $\vec{g_1'}$.

$$\vec{v_{gn}'} = \frac{d\vec{g_1}}{d\beta} \bigg/ \left\|\frac{d\vec{g_1}}{d\beta}\right\|$$

The first velocity unit vector $\vec{v_{gn}'}$ is a velocity unit vector in the XYZ coordinate system having an XY plane in which the orbital plane 300 of the satellite 100 lies and the origin at the center of the Earth 200, and a first velocity unit vector $\vec{v_{gn}}$ being a real velocity unit vector may be obtained through coordinate rotation. The first velocity unit vector $\vec{v_{gn}}$ may be obtained by rotating the first velocity unit vector $\vec{v_{gn}'}$ by an angle $$\left(\frac{\pi}{2}-\gamma\right)$$

around the X-axis to locate the satellite 100 in the orbital plane 300 having a real inclination angle $\gamma$.

$$R_\gamma = \begin{bmatrix} 1 & 0 & 0 \\ 0 & \cos\left(\frac{\pi}{2}-\gamma\right) & -\sin\left(\frac{\pi}{2}-\gamma\right) \\ 0 & \sin\left(\frac{\pi}{2}-\gamma\right) & \cos\left(\frac{\pi}{2}-\gamma\right) \end{bmatrix}$$

$\vec{v_{gn}} \leftarrow R_\gamma \vec{v_{gn}'}$

The first ground point $g'_1$, the second ground point $g'_2$, the third ground point $g'_3$, the fourth ground point $g'_4$, the first position point S', the first position vector $\vec{g_1'}$, the second position vector $\vec{g_2'}$, the third position vector $\vec{g_3'}$, and the fourth position vector $\vec{g_4'}$ may be rotated by $\pi/2-\gamma$ around the X-axis to obtain the first ground point $g_1$, the second ground point $g_2$, the third ground point $g_3$, the fourth ground point $g_4$, the first position point S, the first position vector $\vec{g_1}$, the second position vector $\vec{g_2}$, the third position vector $\vec{g_3}$, and the fourth position vector $\vec{g_4}$ shown in FIG. 4.

In addition, the first unit vector $\vec{g_n'}$ obtained by normalizing the first position vector may be rotated by $$\frac{\pi}{2}-\gamma$$

to obtain the first unit vector $\vec{g_n}$ so as to calculate the direction of rotation of the Earth 200 and the due north direction at the first ground point $g_1$. Hereinafter, the direction of rotation of the Earth 200 and the due north direction at the first ground point $g_1$ are derived using the first unit vector $\vec{g_n}$ with reference to FIGS. 10 and 11.

Figure 10:
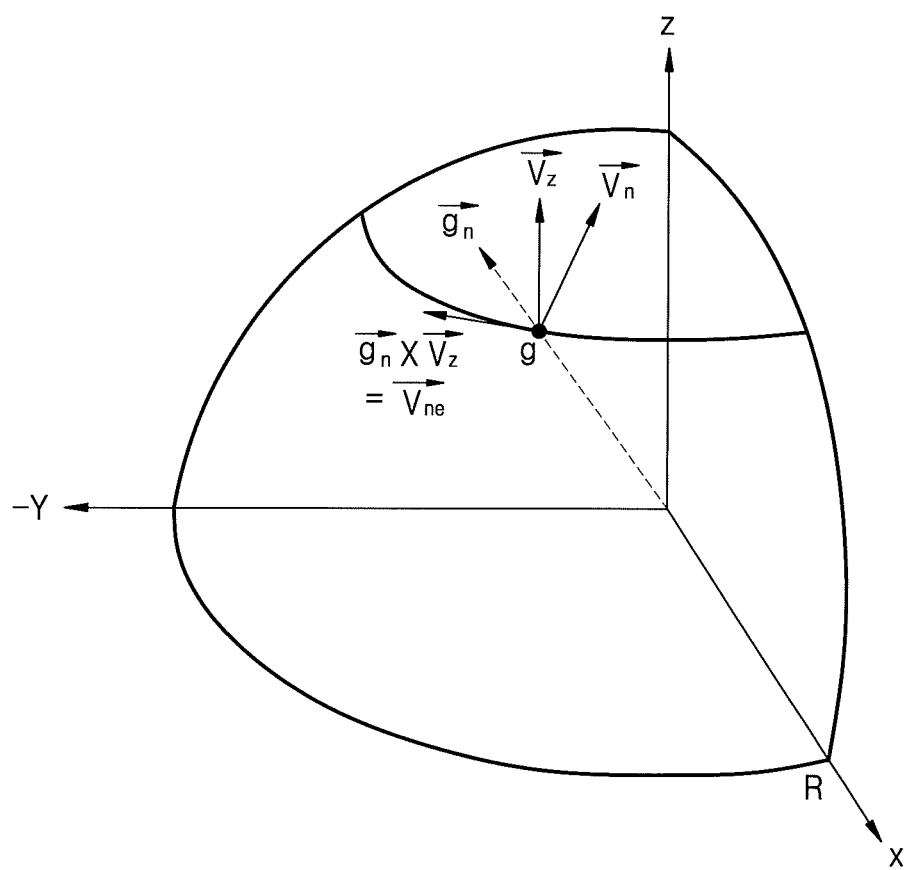
FIG. 10 is a schematic coordinate view illustrating a portion of the Earth and the satellite in an XYZ coordinate system to explain a third direction vector pointing from a first ground point to the due north through a relationship between the portion of the Earth and the position of the satellite according to an embodiment.
Figure 11:
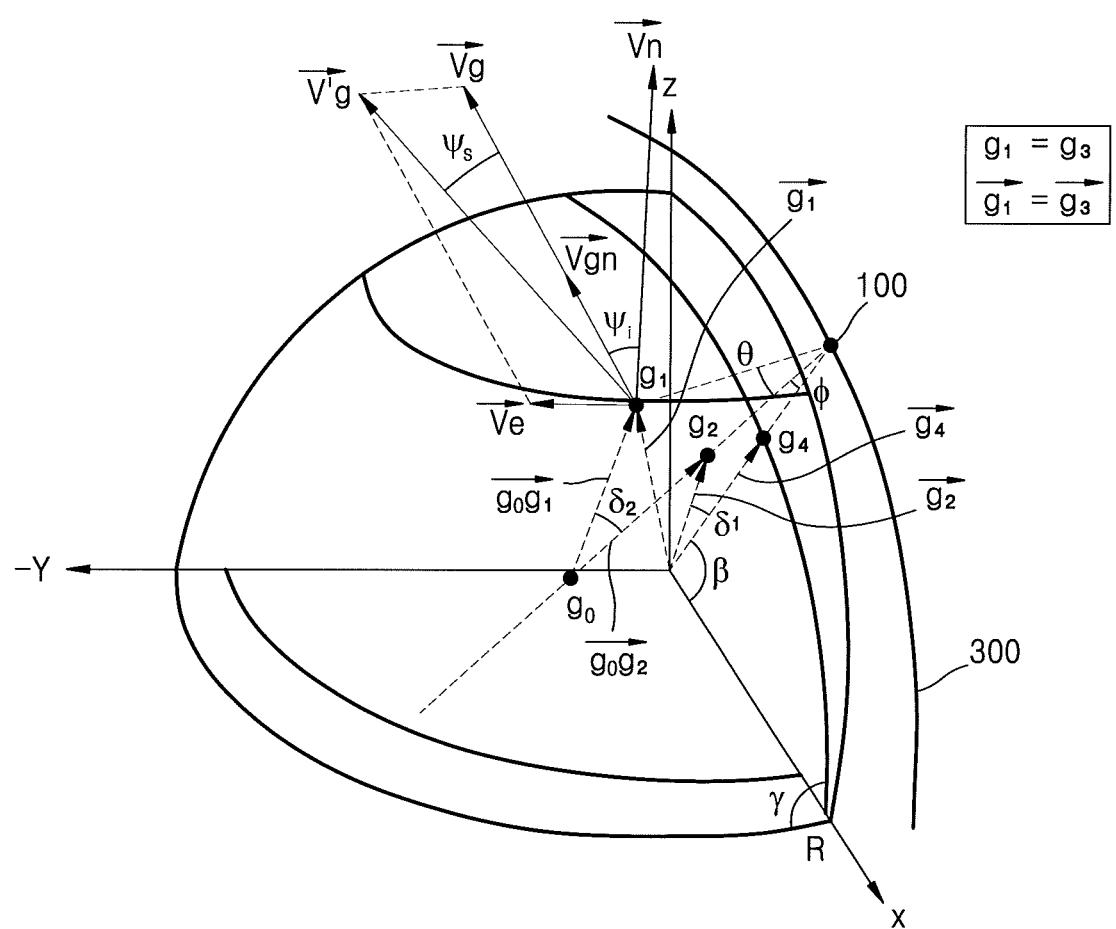
FIG. 11 is a schematic coordinate view illustrating a portion of the Earth and the satellite in an XYZ coordinate system to explain a method of calculating a compensation angle using a first velocity vector according to an embodiment.

FIG. 10 is a coordinate view schematically illustrating a portion of the Earth 200 and the satellite 100 in an XYZ coordinate system to explain a third direction vector pointing from a first ground point to the due north through a relationship between the portion of the Earth 200 and the satellite 100 according to an embodiment, and FIG. 11 is a coordinate view schematically illustrating the portion of the Earth 200 and the satellite 100 in the XYZ coordinate system to explain a method of calculating a compensation angle using a first velocity vector according to an embodiment. Referring to FIGS. 10 and 11, the XYZ coordinate system has the origin at the center of the Earth 200 and the Z-axis along the axis of rotation of the Earth 200. In the coordinate view, the Earth 200 having a radius R is partially illustrated, an XY plane is parallel with the equatorial plane of the Earth 200, and an orbital plane 300 formed by an orbit of the satellite 100 has an inclination angle $\gamma$ with the XY plane.

A second direction vector $\vec{v}_{ne}$ passing through a first ground point $g_1$ and tangential to a circumference parallel with the XY plane may be obtained from the cross product of a first unit vector $\vec{g}_n$ and a first direction vector $\vec{v}_z$. The second direction vector $\vec{v}_{ne}$ is in the direction of the velocity of a ground surface of the Earth 200 rotating on its axis. A third direction vector $\vec{v}_n$ meeting the first ground point $g_1$ and pointing north may be obtained from the cross product of the second direction vector $\vec{v}_{ne}$ and the first unit vector $\vec{g}_n$. These may be expressed by the following equations (refer to FIG. 10).

$$\vec{g}_n = \frac{\vec{g1}}{\|\vec{g1}\|}$$

$$\vec{v}_z = [0 \ 0 \ 1]^T$$

$$\vec{v}_n = \frac{(\vec{g}_n \times \vec{v}_z) \times \vec{g}_n}{\|(\vec{g}_n \times \vec{v}_z) \times \vec{g}_n\|}$$

A first compensation angle $\psi_s$ for the effect of the rotation of the Earth 200 may be calculated using the equations. The speed of the rotation of the Earth 200 is calculated to calculate the first compensation angle $\psi_s$. The speed of the rotation of the Earth 200 at the latitude of the first ground point $g_1$ is calculated, and a third velocity vector $\vec{v}_e$ may be calculated by multiplying the second direction vector $\vec{v}_{ne}$ by the speed.

For example, the speed of rotation of the Earth 200 at a ground surface is calculated based on the fact that the Earth 200 rotates once in 24 hours. This may be expressed by the following equation.

$$\vec{v}_e = \frac{-2\pi R \cos(\phi_g)}{86400} \frac{\vec{g}_n \times \vec{v}_z}{\|\vec{g}_n \times \vec{v}_z\|}$$

A first velocity vector $\vec{v}_g$ may be calculated by multiplying the revolution speed of the satellite 100 by a first velocity unit vector $\vec{v}_{gn}$. The revolution speed of the satellite 100 may be calculated using Kepler's third law. When the mass M of the Earth 200 is 5.9736E+24 kg, the radius of the Earth 200 is R, the altitude of the satellite 100 is h, and the mass of the satellite 100 is m, the square of the period T of revolution of the satellite 100 is proportional to the cube of the distance (R+h) between the Earth 200 and the satellite 100. The mass of the satellite 100 is very small compared to the mass M of the Earth 200 and is thus neglectable. The revolution speed of the satellite 100 is as follows.

$$T^2 = \frac{4\pi^2}{G(M+m)}(R+h)^3 = \frac{(R+h)^3}{k}$$

$$k = \frac{GM}{4\pi^2} = 1.00971 \cdot 10^{13}, k: \text{kepler constant}$$

$$\|\vec{v}_g\| = \frac{2\pi R}{T} = \frac{2\pi R \sqrt{k}}{(R+h)^{1.5}}$$

As expressed by the following equation, the first velocity vector $\vec{v}_g$ is a product of the ground speed of the satellite 100 by the rotation of the satellite 100 and the first velocity unit vector $\vec{v}_{gn}$.

$$\vec{v}_g = \frac{2\pi \cdot 3.1776 \cdot 10^6 R}{(R+h)^{1.5}} \vec{v}_{gn}$$

Next, a second velocity vector $\vec{v_g'}$ is calculated by adding the first velocity vector $\vec{v}_g$ and the third velocity vector $\vec{v}_e$. The second velocity vector $\vec{v_g'}$ is calculated as follows by considering the movement of a surface of the Earth 200 by the rotation of the Earth 200.

$$\vec{v}_g' = \vec{v}_g + \vec{v}_e$$

The first compensation angle $\psi_s$ is an angle between the first velocity vector $\vec{v}_g$ and the second velocity vector $\vec{v_g'}$. The first compensation angle $\psi_s$ is expressed by the following equation (refer to FIG. 11).

$$\Psi_s = \cos^{-1}\left(\frac{\vec{v}_g \cdot \vec{v}_g'}{\|\vec{v}_g\|\|\vec{v}_g'\|}\right)$$

The angular difference between the proceeding direction of the satellite 100 and the ground trace of the satellite 100 caused by the rotation of the Earth 200 may be estimated by calculating the first compensation angle $\psi_s$.

A second compensation angle $\psi_i$ is an angular difference between the proceeding direction of the satellite 100 and the due north direction on the surface of the Earth 200 caused by the inclination angle $\gamma$ of the orbital plane 300 of the satellite 100. The second compensation angle $\psi_i$ is an angle of the first velocity unit vector $\vec{v}_{gn}$ from the north direction of the Earth 200. The second compensation angle $\psi_i$ may be calculated from the angle between the first velocity unit vector $\vec{v}_{gn}$ and the third direction vector $\vec{v}_n$. The second compensation angle $\psi_i$ is calculated as follows.

$$\psi_i = \cos^{-1}(\vec{v}_n \cdot \vec{v}_{gn})$$

The angular difference between the proceeding direction of the satellite 100 and the due north direction on the surface of the Earth 200 caused by the rotation of the Earth 200 and the inclination angle $\gamma$ of the orbital plane 300 may be estimated from the sum of the first compensation angle $\psi_s$ and the second compensation angle $\psi_i$. A compensation angle $\psi_c$ for the yaw angle $\psi$ for photographing in the due north direction may be obtained by adding the first compensation angle $\psi_s$ and the second compensation angle $\psi_i$. This is expressed by the following equation.

$$\psi_c = \psi_i + \psi_s$$

Figure 12:
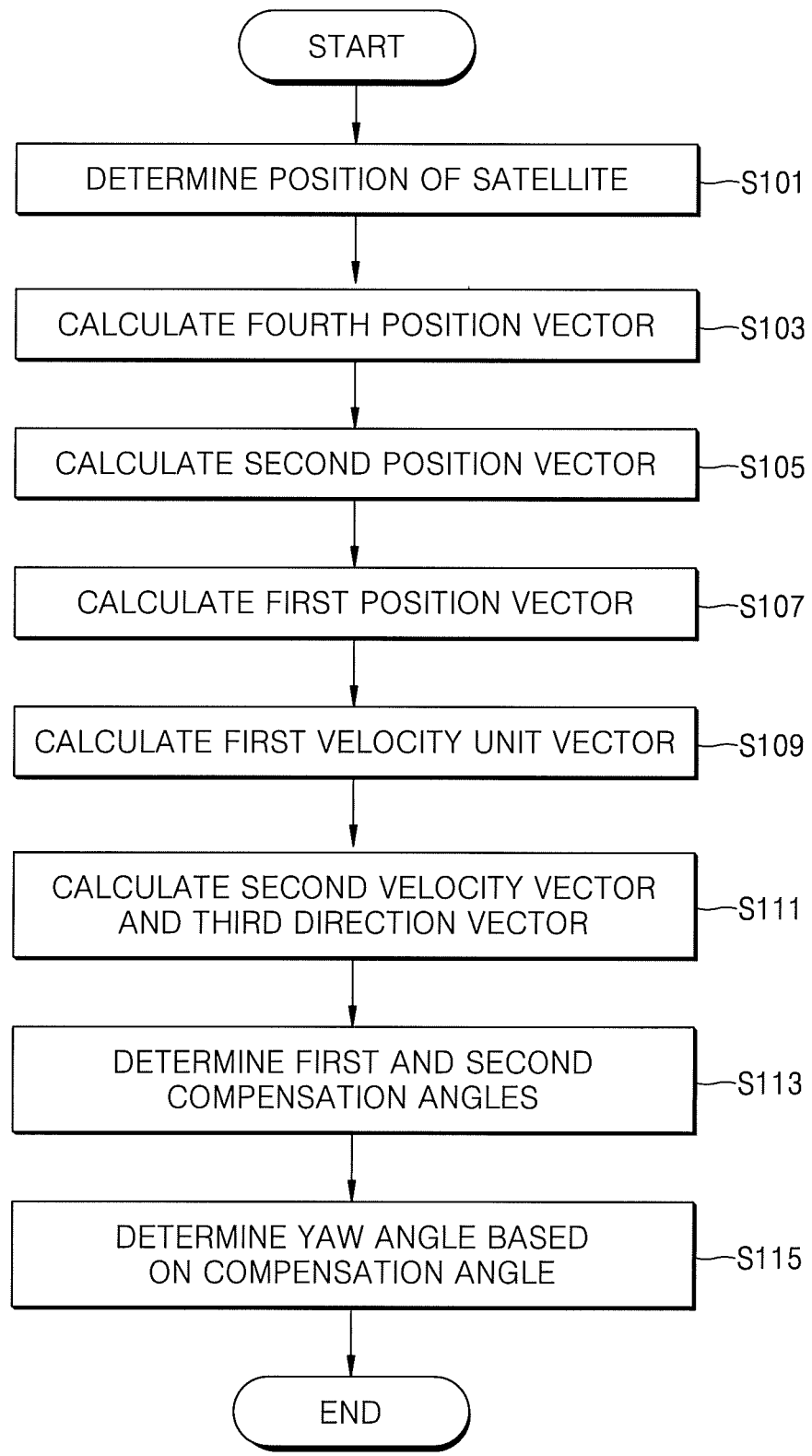
FIG. 12 is a flowchart illustrating a method of calculating a compensation angle, according to an embodiment.

FIG. 12 is a flowchart illustrating a method of calculating a compensation angle, according to an embodiment.

Referring to FIG. 12, the position of a satellite 100 is first determined to calculate a first position vector $\vec{g}_1$. The position of the satellite 100 is expressed as a function of a first parameter β (S101). The following description is presented under the assumption that a roll angle ϕ and a pitch angle θ for pointing the line-of-sight vector of the satellite 100 to a photographing point are determined.

After determining the position of the satellite 100, a fourth ground point $g_4$ meeting the line-of-sight vector of the satellite 100 pointing to the center of the Earth 200 from the determined position, and a fourth position vector $\vec{g_4}$ are calculated (S103).

Next, a first angle $\delta_1$ corresponding to the determined roll angle ϕ is calculated, and a second position vector $\vec{g_2}$ after adjustment to the determined roll angle ϕ is calculated by rotating a point (R, 0, 0) (refer to FIG. 6) by the first angle $\delta_1$ in a negative direction around an Z-axis based on the center of the Earth 200, and then by the first parameter β in a negative direction around the Y-axis direction (S105).

After the second position vector $\vec{g_2}$ is calculated, a second angle $\delta_2$ corresponding to adjustment to the determined pitch angle θ is calculated. The second ground point $g_2$ is rotated by the second angle $\delta_2$ calculated along the first circuit C1 shown in FIG. 4, so as to calculate a first position vector $\vec{g_1}$. Since the first position vector $\vec{g_1}$ is calculated by rotating the fourth position vector $\vec{g_4}$ by the first angle $\delta_1$ and the second angle $\delta_2$, the first position vector $\vec{g_1}$ may be expressed by a relationship with the first parameter β (S107).

Next, a first velocity unit vector $\vec{v}_{gn}$ may be calculated by differentiating the first position vector $\vec{g_1}$ with respect to the first parameter β and normalizing the derivative of the first position vector $\vec{g_1}$ (S109).

A second direction vector $\vec{v}_{ne}$ and a third direction vector $\vec{v}_n$ may be calculated based on a first unit vector $\vec{g}_n$. A third velocity vector $\vec{v}_e$ is calculated by multiplying the second direction vector $\vec{v}_{ne}$ by the velocity of a ground surface of the Earth 200 rotating on its axis, and a second velocity vector $\vec{vg'}$ is calculated by adding the third velocity vector $\vec{v}_e$ and the first velocity vector $\vec{v}_g$. The first velocity vector $\vec{v}_g$ may be calculated by multiplying the first velocity unit vector $\vec{v}_{gn}$ by the revolution speed of the satellite 100, and the third direction vector $\vec{v}_n$ contacts a first ground point $g_1$ and points to the north (S111).

After calculating the second velocity vector $\vec{vg'}$ and the third direction vector $\vec{v}_n$, a first compensation angle $\psi_s$ may be calculated by calculating the angle between the first velocity vector $\vec{v}_g$ and the second velocity vector $\vec{vg'}$, and a second compensation angle $\psi_i$ may be calculated by calculating the angle between the first velocity unit vector $\vec{v}_{gn}$ and the third direction vector $\vec{v}_n$ (S113).

After the first compensation angle $\psi_s$ and the second compensation angle $\psi_i$ are calculated, a compensation angle $\psi_c$ may be calculated by adding the first compensation angle $\psi_s$ and the second compensation angle $\psi_i$. The compensation angle $\psi_c$ is determined as a yaw angle ψ for the satellite 100 to photograph due-north images (S115).

FIG. 13 is a flowchart illustrating a method of adjusting a roll angle, a pitch angle, and a yaw angle of a satellite 100 according to an embodiment.

Referring to FIG. 13, the satellite 100 receives information about the latitude and longitude of a position to be photographed according to a set algorithm or from a ground station. The satellite 100 determines a photographing point according to the information (S201).

Next, the satellite 100 obtains position information such as the altitude, latitude, or longitude of the position of the satellite 100 (S203).

A roll angle ϕ and a pitch angle θ for pointing the line-of-sight vector of the satellite 100 to the photographing point are calculated and determined based on the obtained position information about the satellite 100 (S205).

The satellite 100 calculates a first position vector $\vec{g_1}$ having a functional relationship with a first parameter β, and a first velocity unit vector $\vec{v}_{gn}$ by differentiating the first position vector $\vec{g_1}$ with respect to the first parameter β and normalizing the derivative of the first position vector $\vec{g_1}$. A second direction vector $\vec{v}_{ne}$ indicating the moving direction of a ground surface of the Earth 200 rotating on its axis, and a third direction vector $\vec{v}_n$ pointing from the first ground point $g_1$ to the due north are calculated based on the a first unit vector $\vec{g}_n$. A second velocity vector $\vec{vg'}$ is calculated based on the second direction vector $\vec{v}_{ne}$. The angle between the second velocity vector $\vec{vg'}$ and the first velocity unit vector $\vec{v}_{gn}$ is determined as a first compensation angle $\psi_s$, and the angle between a first direction vector $\vec{v}_z$ and the first velocity unit vector $\vec{v}_{gn}$ is determined as a second compensation angle $\psi_i$. A compensation angle $\psi_c$ is calculated by adding the first compensation angle $\psi_s$ and the second compensation angle $\psi_i$. The compensation angle $\psi_c$ is determined as a yaw angle ψ for rotating the satellite 100 on the yaw axis t2 shown in FIG. 2 (S207).

The satellite 100 may be rotated by the determined roll angle ϕ, pitch angle θ, and yaw angle ψ so as to point the photographing device in a direction corresponding to the direction of a ground trace of the satellite 100 and thus to photograph images in the due north direction. In this manner, the satellite 100 may photograph due-north images including the photographing point (S209).

If images captured by the satellite 100 according to an embodiment are arranged in alignment with the latitude and longitude, an image having a quadrangle shape may be obtained. Since the yaw angle ψ of the satellite 100 is adjusted by considering the angular difference between the proceeding direction and the ground trace of the satellite 100, the photographing device 110 may capture due-north images including the photographing point while having an angle with the proceeding direction of the satellite 100. That is, the yaw angle ψ may be adjusted to align the direction of images captured by the photographing device 110 with a ground trace pointing from the photographing point to the due north while the direction of the images make an angle from the proceeding direction of the satellite 100.

As described above, the yaw angle ψ is calculated by considering an angular difference between the ground trace and proceeding direction of the satellite 100 caused by the rotation of the Earth 200 and the inclination angle γ. Owing to the adjustment of the yaw angle ψ of the satellite 100, the satellite 100 may capture images having a quadrangle shape within a latitude range and a longitude range. In this case, quadrangular images of a wide area may be obtained compared to the first image described with reference to FIGS. 3A and 3B. In this case, the satellite 100 may obtain quadrangular images having a resolution corresponding to the resolution of the photographing device 110. In general, consumers require due-north images, and thus the satellite 100 of the any one of the embodiment capable of capturing images having quadrangle shape may be useful.

As described above, one or more embodiments provide a method of adjusting the yaw angle ψ of a satellite by considering the effect of rotation of the Earth and an angular difference existing between the proceeding direction and the ground trace of the satellite because of an inclined angle of the orbital plane of the satellite from the equatorial plane of the Earth, thereby making it possible to capture images of a ground surface in the due north direction. In addition, one or more embodiments provide a computer-readable recording medium storing a program for executing the method.

The above-described embodiments may be implemented in the form of program instructions executable on a computer using various components, and the program instructions may be stored in computer-readable recording media. The computer-readable recording media may include, individually or in combination, program instructions, data files, data structures, etc. In addition, the computer instructions stored in the computer-readable recording media may be those designed and configured according to the embodiments or well known in the computer software industry. The computer-readable recording media include hardware devices specifically configured to store program instructions and execute the program instructions, and examples of the hardware devices includes: magnetic media such as hard disks, floppy disks, and magnetic tapes; optical recording media such as CD-ROMs and DVDs; magneto-optical media such as floptical disks; and ROMs, RAMs, and flash memories. Examples of the program instructions may include machine codes made by compilers and high-level language codes executable on computers using interpreters. In an embodiment, a hardware device may be replaced with at least one software module so as to perform processes according to embodiments, and vice versa.

In addition, the above-described operations or embodiments are examples which are not intended to limit the scope and spirit of the inventive concept. In the present disclosure, descriptions of known electric components, control systems, software, and other functional aspects thereof may not given for conciseness. Furthermore, in the drawings, connection lines or members between elements are exemplary functional, physical, and/or electric connections that can be replaced with or used together with other functional, physical, and/or electrical connections. Elements described without using terms such as "essential" and "important" may not be necessary for constituting the inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of controlling a satellite moving along an orbit having an inclination angle from the equatorial plane to capture due-north images, the method comprising:
   determining a position of the satellite;
   calculating a roll angle and a pitch angle of the satellite for pointing a line-of-sight vector of the satellite to a first ground surface being a photographing point;
   determining a compensation angle by considering effects of the inclination angle and rotation of the Earth so as to capture images in a direction corresponding to a due north direction of the photographing point;
   calculating a yaw angle based on the compensation angle; and
   rotating the satellite according to the calculated roll angle, pitch angle, and yaw angle.

2. The method of claim 1, wherein the compensation angle is determined by considering an angle between a ground trace pointing due north at the photographing point and a proceeding direction of the satellite.

3. The method of claim 2, wherein the determining of the compensation angle comprises:
   calculating a first position vector, the first position vector pointing from the center of the Earth to a first ground point and expressed by a function of a first parameter varying according to revolution of the satellite; and
   calculating a first velocity unit vector by differentiating the first position vector with respect to the first parameter and normalizing the derivative of the first position vector,
   wherein the first velocity unit vector is calculated without considering the influence of the rotation of the Earth.

4. The method of claim 3, wherein the first parameter is a variable related to an angle between a position vector pointing from the center of the Earth to the satellite and a straight line along which an orbital plane of the satellite meets the equatorial plane of the Earth.

5. The method of claim 4, wherein the calculating of the first position vector comprises:
   determining a nadir point based on the position of the satellite, the nadir point being a ground surface that the line-of-sight vector of the satellite meets when the line-of-sight vector points to the center of the Earth; and
   calculating a fourth position vector pointing from the center of the Earth to the nadir point and having a functional relationship with the first parameter.

6. The method of claim 5, wherein the first position vector is determined by considering the line-of-sight vector varying at the nadir point according to adjustment to the roll angle and the pitch angle.

7. The method of claim 6, further comprising:
   calculating a second ground surface to which the line-of-sight vector points after the adjustment to the roll angle, and a second position vector pointing from the center of the Earth to the second ground surface; and
   calculating a third ground surface to which the line-of-sight vector points after the adjustment to the pitch angle, and a third position vector pointing from the center of the Earth to the third ground surface,
   wherein the first position vector is one of the second position vector and the third position vector.

8. The method of claim 7, wherein the calculating of the second position vector comprises:
   calculating a first angle corresponding to the roll angle; and calculating the second position vector based on the first angle, wherein the first angle is an angle between a position vector before the adjustment to the roll angle and a position vector after the adjustment to the roll angle.

9. The method of claim 7, wherein the calculating of the third position vector comprises:

calculating a second angle corresponding to the pitch angle; and calculating the third position vector based on the second angle, wherein the second angle is an angle at a reference point between a ground surface meeting the line-of-sight vector before the adjustment to the pitch angle and a ground surface meeting the line-of-sight vector after the adjustment to the pitch angle, and the reference point is a center point between two points at which the line-of-sight vector crosses the surface of the Earth.

10. The method of claim 9, wherein the calculating of the third position vector comprises:

calculating a position vector pointing to the reference point from the center of the Earth; and calculating the third position vector by rotating the ground surface meeting the line-of-sight vector before the adjustment to the pitch angle by the second angle around the position vector pointing to the reference point.

11. The method of claim 3, wherein the determining of the compensation angle further comprises:

determining a first compensation angle for the rotation of the Earth by considering an angle between a second velocity vector and the first velocity unit vector, the second velocity vector being a velocity vector of the first ground point; and determining a second compensation angle for the inclination angle by considering an angle between the due north direction of the photographing point and the first velocity unit vector, wherein the compensation angle is the sum of the first compensation angle and the second compensation angle.

12. The method of claim 11, wherein the determining of the first compensation angle comprises:

calculating a first unit vector by normalizing the first position vector;

calculating a second unit vector based on the first unit vector, the second unit vector pointing from the first ground point in a direction of the rotation of the Earth; and calculating the second velocity vector by adding a first velocity vector and a third velocity vector, the first velocity vector being calculated by multiplying the first velocity unit vector by a revolution speed of the satellite, the third velocity vector being calculated by multiplying the second unit vector by a rotation speed of the Earth at the first ground point.

13. The method of claim 12, wherein the determining of the second compensation angle comprises calculating a direction vector being an cross product of the first unit vector and the third velocity vector, the direction vector contacting the photographing point and pointing due north, wherein the second compensation angle is an angle between the direction vector and the first velocity unit vector.

14. The method of claim 4, wherein the first position vector is calculated in an XYZ orthogonal coordinate system having an XZ plane containing the orbital plane of the satellite and an origin at the center of the Earth.

15. The method of claim 14, wherein the calculating of the first velocity unit vector comprises rotating the first position vector and the first velocity unit vector around an X-axis based on the inclination angle.

16. The method of claim 15, wherein the determining of the compensation angle comprises:

determining an angle between a second velocity vector and the first velocity unit vector as a first compensation angle for the rotation of the Earth, the second velocity vector being a velocity vector of the first ground point; and determining a second compensation angle for the inclination angle by considering an angle between the due north direction of the photographing point and the first velocity unit vector.

17. The method of claim 16, wherein the determining of the first compensation angle comprises:

calculating a first unit vector by normalizing the first position vector;

calculating a second unit vector based on the first unit vector, the second unit vector pointing from the first ground point in a direction of the rotation of the Earth; and calculating the second velocity vector by adding a first velocity vector and a third velocity vector, the first velocity vector being calculated by multiplying the first velocity unit vector by a revolution speed of the satellite, the third velocity vector being calculated by multiplying the second unit vector by a rotation speed of the Earth at the first ground point.

18. The method of claim 17, wherein the determining of the second compensation angle comprises calculating a direction vector being an cross product of the first unit vector and the third velocity vector, the direction vector contacting the photographing point and pointing due north, wherein the second compensation angle is an angle between the direction vector and the first velocity unit vector.

19. A computer-readable recording medium storing a program for executing the method of claim 1.

* * * * *